United States Patent
Zhang

(10) Patent No.: US 10,779,241 B2
(45) Date of Patent: Sep. 15, 2020

(54) FULL-DUPLEX TRANSMISSION CONTROL METHOD, USER EQUIPMENT, AND BASE STATION

(71) Applicant: Huawei Technologies Co., Ltd., Shenzhen (CN)

(72) Inventor: Lili Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 165 days.

(21) Appl. No.: 15/750,746

(22) PCT Filed: Aug. 7, 2015

(86) PCT No.: PCT/CN2015/086363
§ 371 (c)(1),
(2) Date: Feb. 6, 2018

(87) PCT Pub. No.: WO2017/024441
PCT Pub. Date: Feb. 16, 2017

(65) Prior Publication Data
US 2019/0357149 A1    Nov. 21, 2019

(51) Int. Cl.
*H04W 52/14*   (2009.01)
*H04W 72/12*   (2009.01)
(Continued)

(52) U.S. Cl.
CPC ......... *H04W 52/146* (2013.01); *H04L 1/0005* (2013.01); *H04L 5/16* (2013.01); *H04W 72/1284* (2013.01); *H04W 72/14* (2013.01)

(58) Field of Classification Search
CPC ..... H04W 52/04; H04W 52/08; H04W 52/10; H04W 52/143; H04W 52/146;
(Continued)

(56) References Cited

U.S. PATENT DOCUMENTS 9,426,682 B2    8/2016  Sun et al.
10,243,720 B2 *  3/2019  Lee ........................ H04L 5/0066
(Continued)

FOREIGN PATENT DOCUMENTS

CN    103109490 A    5/2013
CN    104137638 A    11/2014
(Continued)

OTHER PUBLICATIONS

Machine Translation and Abstract of International Publication No. WO2015077987, dated Jun. 4, 2015, 61 pages.
(Continued)

*Primary Examiner* — Nishant Divecha
(74) *Attorney, Agent, or Firm* — Conley Rose, P.C.

(57) ABSTRACT

A full-duplex transmission control method, user equipment, and a base station, where the full-duplex transmission control method includes obtaining, by user equipment, a first time resource unit, correcting, by the user equipment according to a power offset obtained by the user equipment, first uplink transmission power used for half-duplex transmission to obtain second uplink transmission power used for the full-duplex transmission when the user equipment obtains, from the first time resource unit, included scheduling grant information indicating full-duplex transmission, and transmitting, by the user equipment, an uplink signal in the first time resource unit or a second time resource unit according to the second uplink transmission power, where the second time resource unit is a time resource unit that is after the first time resource unit in terms of time.

20 Claims, 5 Drawing Sheets

(51) Int. Cl.
*H04W 72/14* (2009.01)
*H04L 1/00* (2006.01)
*H04L 5/16* (2006.01)

(58) Field of Classification Search
CPC ... H04W 52/16; H04W 52/18; H04W 52/221; H04W 52/32; H04W 52/60; H04W 72/1278; H04W 72/14; H04W 74/002; H04W 74/02; H04W 52/52; H04L 5/16; H04L 5/14; H04L 5/0055
See application file for complete search history.

(56) References Cited

U.S. PATENT DOCUMENTS

| | | | |
|---|---|---|---|
| 2010/0111008 A1* | 5/2010 | Ishii | H04W 52/16 370/329 |
| 2013/0188536 A1 | 7/2013 | Pirskanen et al. | |
| 2013/0223296 A1 | 8/2013 | Zeng et al. | |
| 2013/0229952 A1 | 9/2013 | Koskinen et al. | |
| 2013/0336177 A1 | 12/2013 | Gao et al. | |
| 2014/0036742 A1 | 2/2014 | Charbit et al. | |
| 2014/0160967 A1 | 6/2014 | Gao et al. | |
| 2014/0348040 A1 | 11/2014 | Hong et al. | |
| 2015/0318967 A1 | 11/2015 | Lyu et al. | |
| 2016/0182213 A1* | 6/2016 | Golitschek Edler von Elbwart | H04L 1/1854 370/294 |
| 2016/0323830 A1 | 11/2016 | Kim et al. | |
| 2018/0184409 A1* | 6/2018 | Min | H04L 5/0007 |

FOREIGN PATENT DOCUMENTS

| | | | | |
|---|---|---|---|---|
| EP | 2679068 | B1 | 4/2017 | |
| GB | 2499259 | * | 2/2012 | ............... H04L 5/16 |
| WO | 2012095683 | A1 | 7/2012 | |
| WO | 2015077987 | A1 | 6/2015 | |
| WO | 2015094914 | A1 | 6/2015 | |
| WO | 2015099344 | A1 | 7/2015 | |

OTHER PUBLICATIONS

"3rd Generation Partnership Project; Technical Specification Group Radio Access Network; Evolved Universal Terrestrial Radio Access (E-UTRA); Physical Channels and Modulation (Release 9)," 3GPP TS 36.211 V9.1.0, Technical Specification, Mar. 2010, 85 pages.
Choi, J., et al., "Achieving Single Channel, Full Duplex Wireless Communication," 2010, 12 pages.
Everett, E., et al., "Empowering Full-Duplex Wireless Communication by Exploiting Directional Diversity," Signals, Systems and Computers, 2011, 5 pages.
Jain, M., et al., "Practical, Real-time, Full Duplex Wireless," International Conference on Mobile Computing and Networking, Sep. 19-23, 2011, 12 pages.
Sahai, A., et al., "Pushing the limits of Full-duplex: Design and Real-time Implementation," arXiv:1107.0607v1 [cs.NI], Jul. 4, 2011, 12 pages.
Radunovic, B., et al., "Rethinking Indoor Wireless Mesh Design: Low Power, Low Frequency, Full-duplex," Wireless Mesh Networks, 2010, 6 pages.
Foreign Communication From A Counterpart Application, PCT Application No. PCT/CN2015/086363, English Translation of International Search Report dated May 11, 2016, 3 pages.
Foreign Communication From A Counterpart Application, PCT Application No. PCT/CN2015/086363, English Translation of Written Opinion dated May 11, 2016, 7 pages.
Foreign Communication From A Counterpart Application, Chinese Application No. 201580072497.0, Chinese Office Action dated May 5, 2019, 8 pages.
Foreign Communication From A Counterpart Application, European Application No. 15900640.2, Extended European Search Report dated Jun. 25, 2018, 8 pages.

* cited by examiner

FULL-DUPLEX TRANSMISSION CONTROL METHOD, USER EQUIPMENT, AND BASE STATION

CROSS-REFERENCE TO RELATED APPLICATION

This application is a U.S. National Stage of International Patent Application No. PCT/CN2015/086363 filed on Aug. 7, 2015, which is hereby incorporated by reference in its entirety.

TECHNICAL FIELD

Embodiments of the present disclosure relate to the communications field, and in particular, to a full-duplex transmission control method, user equipment, and a base station.

BACKGROUND

Only unidirectional signal transmission can be performed in half-duplex transmission, and bidirectional signal transmission can be performed in full-duplex transmission. Therefore, signal transmission efficiency of the full-duplex transmission is extremely high. From a perspective of a physical layer, compared with the half-duplex transmission, a system throughput of the full-duplex transmission is doubled. The full-duplex transmission also has innovative impact on design of Media Access Control (MAC) such that a future wireless communications system can obtain a higher throughput.

Half-duplex transmission is mainly used in a current wireless communications system such as a WI-FI system or a Long Term Evolution (LTE) system. Signal sending and receiving cannot be simultaneously performed on a same time-frequency resource in the half-duplex transmission. In the other approaches, a full-duplex transmission method used in a WI-FI system is described, and signal sending and receiving can be simultaneously performed on a same channel in the WI-FI system. Because WI-FI transmission may occupy the entire channel, and does not need frequency multiplexing, resource allocation is fixed, and user equipment needs little time to prepare to transmit a signal. Therefore, after detecting or receiving some preambles, the WI-FI system can immediately transmit a signal in order to implement full-duplex transmission.

However, the foregoing full-duplex transmission solution is applicable to only the WI-FI system, and is inapplicable to an LTE system that needs frequency multiplexing, because resource allocation in the LTE system needs to be dynamically determined, and user equipment needs to perform rate matching according to a size of an obtained transport block. Compared with the WI-FI system, in the LTE system, the user equipment needs more time for resource configuration. In a frequency division duplex (FDD) mode in a current LTE system, for uplink scheduling, a base station sends uplink scheduling information to user equipment four milliseconds (ms) earlier, and for downlink scheduling, the user equipment needs to obtain in advance scheduling-related information from the base station, for example, a channel state indication (CSI), a cache size, and a scheduling resource. Downlink scheduling information and downlink data may be transmitted in a same subframe. A scheduling process in the FDD mode may be applied to the LTE system to implement full-duplex transmission. For example, n is a natural number. In an $(n-4)^{th}$ subframe, the base station sends uplink scheduling information for transmitting an uplink channel in an $n^{th}$ subframe, and the base station transmits downlink scheduling information in the $n^{th}$ subframe at the same time. In this way, the user equipment can simultaneously perform signal sending and receiving in the $n^{th}$ subframe.

In the described full-duplex transmission solution implemented in the LTE system, when sending the uplink scheduling information in the $(n-4)^{th}$ subframe, the base station is still unsure of whether there is also downlink transmission in the $n^{th}$ subframe for the same user equipment. In addition, there are different transmission power requirements for uplink transmission in the full-duplex transmission and that in the half-duplex transmission. As a result, the base station is unsure of whether there is a problem of self-interference cancellation in the uplink transmission in the $n^{th}$ subframe in the full-duplex transmission. Consequently, uplink channel power control in the $n^{th}$ subframe cannot be correctly set. Because imprecise power control results in intense self-interference, and the self-interference is hard to be canceled, downlink data is undetectable. Consequently, in the other approaches, in the full-duplex transmission implemented in the LTE system, a system gain is extremely low.

SUMMARY

Embodiments of the present disclosure provide a full-duplex transmission control method, user equipment, and a base station, are used to implement full-duplex transmission in an LTE system and a WI-FI system, and may implement uplink channel power control during the full-duplex transmission in order to improve a system gain of the full-duplex transmission.

According to a first aspect, an embodiment of the present disclosure provides a full-duplex transmission control method, including obtaining, by user equipment, a first time resource unit, correcting, by the user equipment according to a power offset obtained by the user equipment, first uplink transmission power used for half-duplex transmission to obtain second uplink transmission power used for the full-duplex transmission if the user equipment obtains, from the first time resource unit, included scheduling grant information indicating full-duplex transmission, and transmitting, by the user equipment, an uplink signal in the first time resource unit or a second time resource unit according to the second uplink transmission power, where the second time resource unit is a time resource unit that is after the first time resource unit in terms of time.

With reference to the first aspect, in a first possible implementation of the first aspect, obtaining, by user equipment, a first time resource unit includes detecting, by the user equipment in a third time resource unit that is before the first time resource unit, whether there is uplink scheduling information indicating to perform transmission in the first time resource unit or the second time resource unit, and detecting, in the first time resource unit or a fourth time resource unit that is before the first time resource unit, whether there is downlink scheduling information indicating to perform transmission in the first time resource unit or the second time resource unit, where the third time resource unit and the fourth time resource unit are two different time resource units, and determining that the first time resource unit includes the scheduling grant information indicating the full-duplex transmission if the uplink scheduling information is detected in the third time resource unit, a quantity of time resource units between the first time resource unit and the third time resource unit meets a preconfigured difference value, and the downlink scheduling information is detected in the first time resource unit or the fourth time resource unit, or determining that the first time resource unit does not include the scheduling grant information indicating the full-duplex transmission if the uplink scheduling information is not detected in the third time resource unit, a quantity of time resource units between the first time resource unit and the third time resource unit does not meet a preconfigured difference value, or the downlink scheduling information is not detected in the first time resource unit or the fourth time resource unit.

With reference to the first aspect, in a second possible implementation of the first aspect, obtaining, by user equipment, a first time resource unit includes detecting, by the user equipment in the first time resource unit, whether there is uplink feedback information corresponding to the downlink data information transmission in a fifth time resource unit that is before the first time resource unit, and detecting, in the first time resource unit or a fourth time resource unit that is before the first time resource unit, whether there is downlink scheduling information indicating to perform transmission in the first time resource unit or the second time resource unit, where the fourth time resource unit and the fifth time resource unit are two different time resource units, and determining that the first time resource unit includes scheduling information indicating the full-duplex transmission if the uplink feedback information corresponding to the downlink data information transmission in the fifth time resource unit is detected in the first time resource unit, a quantity of time resource units between the first time resource unit and the fifth time resource unit meets a preconfigured difference value, and the downlink scheduling information is detected in the first time resource unit or the fourth time resource unit, or determining that the first time resource unit does not include information about the full-duplex transmission if the uplink feedback information is not detected in the first time resource unit, a quantity of time resource units between the first time resource unit and the fifth time resource unit does not meet a preconfigured difference value, or the downlink scheduling information is not detected in the first time resource unit or the fourth time resource unit.

With reference to the first or the second possible implementation of the first aspect, in a third possible implementation of the first aspect, the uplink scheduling information is uplink grant information, and the downlink scheduling information is downlink grant information.

With reference to the first or the second possible implementation of the first aspect, in a fourth possible implementation of the first aspect, before correcting, by the user equipment according to a power offset obtained by the user equipment, first uplink transmission power used for half-duplex transmission, the method further includes obtaining, by the user equipment from the uplink scheduling information in the third time resource unit, the first uplink transmission power used for the half-duplex transmission, or obtaining, by the user equipment from the fifth time resource unit, the first uplink transmission power used for the half-duplex transmission, and obtaining, by the user equipment, the power offset in a predefined manner, or obtaining the power offset from the first time resource unit or the fourth time resource unit.

With reference to the first, the second, the third, or the fourth possible implementation of the first aspect, in a fifth possible implementation of the first aspect, the uplink signal is uplink data information that the uplink scheduling information in the third time resource unit instructs to transmit in the first time resource unit or the second time resource unit, or the uplink signal is the uplink feedback information that is in the first time resource unit and that is corresponding to downlink data information in the fifth time resource unit.

With reference to the first possible implementation of the first aspect, in a sixth possible implementation of the first aspect, if the uplink scheduling information is detected in the third time resource unit, the quantity of time resource units between the first time resource unit and the third time resource unit meets the preconfigured difference value, and the downlink scheduling information is detected in the first time resource unit or the fourth time resource unit, after detecting, by the user equipment in a third time resource unit that is before the first time resource unit, whether there is uplink scheduling information, the method further includes canceling, by the user equipment according to the power offset included in the downlink scheduling information, uplink data information transmission that the uplink scheduling information in the third time resource unit instructs to perform in the first time resource unit or the second time resource unit if a power offset included in the downlink scheduling information is a preconfigured offset value with a special definition.

With reference to the first aspect, in a seventh possible implementation of the first aspect, the power offset is obtained by the user equipment in a predefined manner, the power offset is detected by the user equipment from downlink scheduling information in the first time resource unit, or the power offset is detected by the user equipment from scheduling grant information in each of multiple configured time resource units, where the multiple configured time resource units are a subset of a set of all grant time resource units in which full-duplex transmission can be detected, and before correcting, by the user equipment according to a power offset obtained by the user equipment, first uplink transmission power used for half-duplex transmission, the method further includes triggering, by the user equipment, the power offset to come into effect if the power offset is obtained by the user equipment in the predefined manner, when detecting corresponding trigger signaling from the scheduling grant information in the first time resource unit or that in a time resource unit that is before the first time resource unit.

With reference to the seventh possible implementation of the first aspect, in an eighth possible implementation of the first aspect, that the power offset is obtained by the user equipment in a predefined manner includes receiving, by the user equipment, broadcast signaling or dedicated signaling sent by a base station, and obtaining, by the user equipment, the power offset using the broadcast signaling or dedicated signaling.

With reference to the seventh possible implementation of the first aspect, in a ninth possible implementation of the first aspect, that the power offset is detected by the user equipment from the scheduling grant information in the first time resource unit, or the power offset is detected by the user equipment from scheduling grant information in each of multiple configured time resource units includes detecting, by the user equipment, the power offset from information newly added to the scheduling grant information, or detecting, by the user equipment, the power offset from original information redefined in the scheduling grant information.

With reference to the first aspect, in a tenth possible implementation of the first aspect, obtaining, by user equipment, a first time resource unit includes detecting, by the user equipment in the first time resource unit, whether there are uplink scheduling information and downlink scheduling information, and determining that the first time resource unit includes the scheduling grant information indicating the full-duplex transmission if both the uplink scheduling information and the downlink scheduling information are detected in the first time resource unit, or determining that the first time resource unit does not include the scheduling grant information indicating the full-duplex transmission if at most one piece of scheduling information in the uplink scheduling information or the downlink scheduling information is detected in the first time resource unit.

With reference to the first aspect, in an eleventh possible implementation of the first aspect, correcting, by the user equipment according to a power offset obtained by the user equipment, first uplink transmission power used for half-duplex transmission to obtain second uplink transmission power used for the full-duplex transmission includes calculating, by the user equipment in the following manner, the second uplink transmission power used for the full-duplex transmission:

$$P_{FD}=P_{HD}-P_{offset},$$

where $P_{FD}$ is the second uplink transmission power, $P_{HD}$ is the first uplink transmission power, and $P_{offset}$ is the power offset obtained by the user equipment.

With reference to the first aspect, in a twelfth possible implementation of the first aspect, after correcting, by the user equipment according to a power offset obtained by the user equipment, first uplink transmission power used for half-duplex transmission, the method further includes obtaining, by the user equipment, a modulation and coding scheme (MCS) offset that matches the power offset, and correcting, by the user equipment according to the MCS offset, a first MCS used for the half-duplex transmission to obtain a second MCS used for the full-duplex transmission.

With reference to the twelfth possible implementation of the first aspect, in a thirteenth possible implementation of the first aspect, obtaining, by the user equipment, an MCS offset that matches the power offset includes receiving, by the user equipment, the MCS offset using broadcast signaling or dedicated signaling, or obtaining, by the user equipment, the MCS offset using a predefined mutual matching relationship between the power offset and the MCS offset.

With reference to the twelfth possible implementation of the first aspect, in a fourteenth possible implementation of the first aspect, correcting, by the user equipment according to the MCS offset, a first MCS index used for the half-duplex transmission to obtain a second MCS index used for the full-duplex transmission includes calculating, by the user equipment in the following manner, the second MCS index used for the full-duplex transmission:

$$MCS_{FD}=MCS_{HD}-MCS_{offset},$$

where $MCS_{FD}$ is the second MCS index, $MCS_{HD}$ is the first MCS index, and $MCS_{offset}$ is the MCS offset.

With reference to the first aspect, in a fifteenth possible implementation of the first aspect, the time resource unit includes a subframe, a frame, a timeslot, and an orthogonal frequency division multiplexing (OFDM) symbol.

According to a second aspect, an embodiment of the present disclosure provides a full-duplex transmission control method, including determining, by a base station, whether user equipment can be instructed in a first time resource unit to perform full-duplex transmission, and obtaining a result of the determining, sending, by the base station to the user equipment in the first time resource unit, included scheduling grant information indicating the user equipment to perform the full-duplex transmission if the result of the determining is that the user equipment can be instructed in the first time resource unit to perform the full-duplex transmission, and receiving, by the base station, an uplink signal that is transmitted after the user equipment obtains the scheduling grant information indicating the full-duplex transmission and in the first time resource unit or a second time resource unit according to second uplink transmission power obtained by correcting first uplink transmission power used for half-duplex transmission, where the second time resource unit is a time resource unit that is after the first time resource unit in terms of time.

With reference to the second aspect, in a first possible implementation of the second aspect, determining, by a base station, whether user equipment can be instructed in a first time resource unit to perform full-duplex transmission includes determining, by the base station, that the user equipment can be instructed in the first time resource unit to perform the full-duplex transmission if the base station transmits, in a third time resource unit that is before the first time resource unit, uplink scheduling information indicating to perform transmission in the first time resource unit or the second time resource unit, and the base station transmits, in the first time resource unit or a fourth time resource unit that is before the first time resource unit, downlink scheduling information indicating to perform transmission in the first time resource unit or the second time resource unit, where the third time resource unit and the fourth time resource unit are two different time resource units, or determining, by the base station, that the user equipment cannot be instructed in the first time resource unit to perform the full-duplex transmission if the base station does not transmit the uplink scheduling information in the third time resource unit, the base station determines that a quantity of time resource units between the first time resource unit and the third time resource unit does not meet a preconfigured difference value, or the base station does not detect the downlink scheduling information in the first time resource unit or the fourth time resource unit.

With reference to the second aspect, in a second possible implementation of the second aspect, determining, by a base station, whether user equipment can be instructed in a first time resource unit to perform full-duplex transmission includes determining, by the base station, that the user equipment can be instructed in the first time resource unit to perform the full-duplex transmission if the base station transmits, in the first time resource unit, uplink feedback information corresponding to the downlink data information transmission in a fifth time resource unit that is before the first time resource unit, and the base station transmits, in the first time resource unit or a fourth time resource unit that is before the first time resource unit, downlink scheduling information indicating to perform transmission in the first time resource unit or the second time resource unit, where the fourth time resource unit and the fifth time resource unit are two different time resource units, or determining, by the base station, that the user equipment can be instructed in the first time resource unit to perform the full-duplex transmission if the base station does not transmit the uplink feedback information in the first time resource unit, the base station determines that a quantity of time resource units between the first time resource unit and the fifth time resource unit does not meet a preconfigured difference value, or the base station does not detect the downlink scheduling information in the first time resource unit or the fourth time resource unit.

With reference to the first possible implementation of the second aspect, in a third possible implementation of the second aspect, the downlink scheduling information includes a preconfigured offset value with a special definition, and the user equipment cancels, according to a power offset included in the downlink scheduling information, uplink data information transmission that the uplink scheduling information in the third time resource unit instructs to perform in the first time resource unit or the second time resource unit.

With reference to the second aspect, in a fourth possible implementation of the second aspect, before the determining, by a base station, whether user equipment can be instructed in a first time resource unit to perform full-duplex transmission, the method further includes sending, by the base station, broadcast signaling or dedicated signaling to the user equipment, where the broadcast signaling or dedicated signaling includes a power offset and/or an MCS offset that are/is configured by the base station.

With reference to the second aspect, in a fifth possible implementation of the second aspect, before the determining, by a base station, whether user equipment can be instructed in a first time resource unit to perform full-duplex transmission, the method further includes newly adding, by the base station, information to the scheduling grant information in the first time resource unit to carry the power offset and/or an MCS offset, adding, by the base station, a power offset and/or an MCS offset to original information redefined in the scheduling grant information in the first time resource unit, newly adding, by the base station, information to scheduling grant information in each of multiple configured time resource units to carry the power offset and/or an MCS offset, or adding, by the base station, a power offset and/or an MCS offset to original information redefined in scheduling grant information in each of multiple configured time resource units.

With reference to the second aspect, in a sixth possible implementation of the second aspect, the time resource unit includes a subframe, a frame, a timeslot, and an OFDM symbol.

According to a third aspect, an embodiment of the present disclosure provides user equipment, including an obtaining module configured to obtain a first time resource unit, a correction module configured to correct, according to a power offset obtained by the user equipment, first uplink transmission power used for half-duplex transmission to obtain second uplink transmission power used for the full-duplex transmission when included scheduling grant information indicating full-duplex transmission is obtained from the first time resource unit, and an uplink control module configured to transmit an uplink signal in the first time resource unit or a second time resource unit according to the second uplink transmission power, where the second time resource unit is a time resource unit that is after the first time resource unit.

With reference to the third aspect, in a first possible implementation of the third aspect, the obtaining module is further configured to detect, in a third time resource unit that is before the first time resource unit, whether there is uplink scheduling information indicating to perform transmission in the first time resource unit or the second time resource unit, and detect, in the first time resource unit or a fourth time resource unit that is before the first time resource unit, whether there is downlink scheduling information indicating to perform transmission in the first time resource unit or the second time resource unit, where the third time resource unit and the fourth time resource unit are two different time resource units, and determine that the first time resource unit includes the scheduling grant information indicating the full-duplex transmission if the uplink scheduling information is detected in the third time resource unit, a quantity of time resource units between the first time resource unit and the third time resource unit meets a preconfigured difference value, and the downlink scheduling information is detected in the first time resource unit or the fourth time resource unit, or determine that the first time resource unit does not include the scheduling grant information indicating the full-duplex transmission if the uplink scheduling information is not detected in the third time resource unit, a quantity of time resource units between the first time resource unit and the third time resource unit does not meet a preconfigured difference value, or the downlink scheduling information is not detected in the first time resource unit or the fourth time resource unit.

With reference to the third aspect, in a second possible implementation of the third aspect, the obtaining module is further configured to detect, in the first time resource unit, whether there is uplink feedback information corresponding to the downlink data information transmission in a fifth time resource unit that is before the first time resource unit, and detect, in the first time resource unit or a fourth time resource unit that is before the first time resource unit, whether there is downlink scheduling information indicating to perform transmission in the first time resource unit or the second time resource unit, where the fourth time resource unit and the fifth time resource unit are two different time resource units, and determine that the first time resource unit includes scheduling information indicating the full-duplex transmission if the uplink feedback information corresponding to the downlink data information transmission in the fifth time resource unit is detected in the first time resource unit, a quantity of time resource units between the first time resource unit and the fifth time resource unit meets a preconfigured difference value, and the downlink scheduling information is detected in the first time resource unit or the fourth time resource unit or determine that the first time resource unit does not include information about the full-duplex transmission if the uplink feedback information is not detected in the first time resource unit, a quantity of time resource units between the first time resource unit and the fifth time resource unit does not meet a preconfigured difference value, or the downlink scheduling information is not detected in the first time resource unit or the fourth time resource unit.

With reference to the first or the second possible implementation of the third aspect, in a third possible implementation of the third aspect, the uplink scheduling information is uplink grant information, and the downlink scheduling information is downlink grant information.

With reference to the first or the second possible implementation of the third aspect, in a fourth possible implementation of the third aspect, the obtaining module is further configured to obtain, from the uplink scheduling information in the third time resource unit, the first uplink transmission power used for the half-duplex transmission, or obtain, from the fifth time resource unit, the first uplink transmission power used for the half-duplex transmission before the correction module corrects, according to the power offset obtained by the user equipment, the first uplink transmission power used for the half-duplex transmission, and obtain the power offset in a predefined manner, or obtain the power offset from the first time resource unit or the fourth time resource unit.

With reference to the first, the second, the third, or the fourth possible implementation of the third aspect, in a fifth possible implementation of the third aspect, the uplink signal is uplink data information that the uplink scheduling information in the third time resource unit instructs to transmit in the first time resource unit or the second time resource unit, or the uplink signal is the uplink feedback information that is in the first time resource unit and that is corresponding to downlink data information in the fifth time resource unit.

With reference to the first possible implementation of the third aspect, in a sixth possible implementation of the third aspect, if the uplink scheduling information is detected in the third time resource unit, the quantity of time resource units between the first time resource unit and the third time resource unit meets the preconfigured difference value, and the downlink scheduling information is detected in the first time resource unit or the fourth time resource unit, and after the obtaining module detects, in the third time resource unit that is before the first time resource unit, whether there is the uplink scheduling information, if a power offset included in the downlink scheduling information is a preconfigured offset value with a special definition, the uplink control module is further configured to cancel, according to the power offset included in the downlink scheduling information, uplink data information transmission that the uplink scheduling information in the third time resource unit instructs to perform in the first time resource unit or the second time resource unit.

With reference to the third aspect, in a seventh possible implementation of the third aspect, the obtaining module is further configured to obtain the power offset in a predefined manner, detect the power offset from downlink scheduling information in the first time resource unit, or detect the power offset from scheduling grant information in each of multiple configured time resource units, where the multiple configured time resource units are a subset of a set of all grant time resource units in which full-duplex transmission can be detected, and before correcting, according to the power offset obtained by the user equipment, the first uplink transmission power used for the half-duplex transmission, if the power offset is obtained by the user equipment in the predefined manner, when corresponding trigger signaling is detected from the scheduling grant information in the first time resource unit or that in a time resource unit that is before the first time resource unit, the correction module is further configured to trigger the power offset to come into effect.

With reference to the seventh possible implementation of the third aspect, in an eighth possible implementation of the third aspect, the obtaining module is further configured to receive broadcast signaling or dedicated signaling sent by a base station, and obtain the power offset using the broadcast signaling or dedicated signaling.

With reference to the seventh possible implementation of the third aspect, in a ninth possible implementation of the third aspect, the obtaining module is further configured to detect the power offset from information newly added to the scheduling grant information, or detect the power offset from original information redefined in the scheduling grant information.

With reference to the third aspect, in a tenth possible implementation of the third aspect, the obtaining module is further configured to detect, in the first time resource unit, whether there are uplink scheduling information and downlink scheduling information, and if both the uplink scheduling information and the downlink scheduling information are detected in the first time resource unit, determine that the first time resource unit includes the scheduling grant information indicating the full-duplex transmission, or if at most one piece of scheduling information in the uplink scheduling information or the downlink scheduling information is detected in the first time resource unit, determine that the first time resource unit does not include the scheduling grant information indicating the full-duplex transmission.

With reference to the third aspect, in an eleventh possible implementation of the third aspect, the correction module is further configured to calculate, in the following manner, the second uplink transmission power used for the full-duplex transmission:

$$P_{FD}=P_{HD}-P_{offset},$$

where $P_{FD}$ is the second uplink transmission power, $P_{HD}$ is the first uplink transmission power, and $P_{offset}$ is the power offset obtained by the user equipment.

With reference to the third aspect, in a twelfth possible implementation of the third aspect, after the correction module corrects, according to the power offset obtained by the user equipment, the first uplink transmission power used for the half-duplex transmission, the obtaining module is further configured to obtain an MCS offset that matches the power offset, and the correction module is further configured to correct, according to the MCS offset, a first MCS index used for the half-duplex transmission, to obtain a second MCS index used for the full-duplex transmission.

With reference to the twelfth possible implementation of the third aspect, in a thirteenth possible implementation of the third aspect, the obtaining module is further configured to receive the MCS offset using broadcast signaling or dedicated signaling, or obtain the MCS offset using a predefined mutual matching relationship between the power offset and the MCS offset.

With reference to the twelfth possible implementation of the third aspect, in a fourteenth possible implementation of the third aspect, the correction module is further configured to calculate, in the following manner, the second MCS index used for the full-duplex transmission:

$$MCS_{FD}=MCS_{HD}-MCS_{offset},$$

where $MCS_{FD}$ is the second MCS index, $MCS_{HD}$ is the first MCS index, and $MCS_{offset}$ is the MCS offset.

With reference to the third aspect, in a fifteenth possible implementation of the third aspect, the time resource unit includes a subframe, a frame, a timeslot, and an OFDM symbol.

According to a fourth aspect, an embodiment of the present disclosure provides a base station, including a full-duplex determining module configured to determine whether user equipment can be instructed in a first time resource unit to perform full-duplex transmission, and obtain a result of the determining, a sending module configured to send, to the user equipment in the first time resource unit, included scheduling grant information indicating the user equipment to perform the full-duplex transmission when the result of the determining is that the user equipment can be instructed in the first time resource unit to perform the full-duplex transmission, and a receiving module configured to receive an uplink signal that is transmitted after the user equipment obtains the scheduling grant information indicating the full-duplex transmission and in the first time resource unit or a second time resource unit according to second uplink transmission power obtained by correcting first uplink transmission power used for half-duplex transmission, where the second time resource unit is a time resource unit that is after the first time resource unit in terms of time.

With reference to the fourth aspect, in a first possible implementation of the fourth aspect, the full-duplex determining module is further configured to determine that the user equipment can be instructed in the first time resource unit to perform the full-duplex transmission if the base station transmits, in a third time resource unit that is before the first time resource unit, uplink scheduling information indicating to perform transmission in the first time resource unit or the second time resource unit, and the base station transmits, in the first time resource unit or a fourth time resource unit that is before the first time resource unit, downlink scheduling information indicating to perform transmission in the first time resource unit or the second time resource unit, where the third time resource unit and the fourth time resource unit are two different time resource units, or determine that the user equipment cannot be instructed in the first time resource unit to perform the full-duplex transmission if the base station does not transmit the uplink scheduling information in the third time resource unit, the base station determines that a quantity of time resource units between the first time resource unit and the third time resource unit does not meet a preconfigured difference value, or the base station does not detect the downlink scheduling information in the first time resource unit or the fourth time resource unit.

With reference to the fourth aspect, in a second possible implementation of the fourth aspect, the full-duplex determining module is further configured to determine that the user equipment can be instructed in the first time resource unit to perform the full-duplex transmission if the base station transmits, in the first time resource unit, uplink feedback information corresponding to the downlink data information transmission in a fifth time resource unit that is before the first time resource unit, and the base station transmits, in the first time resource unit or a fourth time resource unit that is before the first time resource unit, downlink scheduling information indicating to perform transmission in the first time resource unit or the second time resource unit, where the fourth time resource unit and the fifth time resource unit are two different time resource units, or determine that the user equipment can be instructed in the first time resource unit to perform the full-duplex transmission if the base station does not transmit the uplink feedback information in the first time resource unit, the base station determines that a quantity of time resource units between the first time resource unit and the fifth time resource unit does not meet a preconfigured difference value, or the base station does not detect the downlink scheduling information in the first time resource unit or the fourth time resource unit.

With reference to the first possible implementation of the fourth aspect, in a third possible implementation of the fourth aspect, the downlink scheduling information includes a preconfigured offset value with a special definition, and the user equipment cancels, according to a power offset included in the downlink scheduling information, uplink data information transmission that the uplink scheduling information in the third time resource unit instructs to perform in the first time resource unit or the second time resource unit.

With reference to the fourth aspect, in a fourth possible implementation of the fourth aspect, the base station further includes the sending module, and the sending module is further configured to send broadcast signaling or dedicated signaling to the user equipment before the full-duplex determining module determines whether the user equipment can be instructed in the first time resource unit to perform the full-duplex transmission, where the broadcast signaling or dedicated signaling includes a power offset and/or an MCS offset that are/is configured by the base station.

With reference to the fourth aspect, in a fifth possible implementation of the fourth aspect, the base station further includes a configuration module and configured to, before the full-duplex determining module determines whether the user equipment can be instructed in the first time resource unit to perform the full-duplex transmission, newly add information to the scheduling grant information in the first time resource unit to carry the power offset and/or an MCS offset, add, by the base station, a power offset and/or an MCS offset to original information redefined in the scheduling grant information in the first time resource unit, newly add, by the base station, information to scheduling grant information in each of multiple configured time resource units to carry the power offset and/or an MCS offset, or add, by the base station, a power offset and/or an MCS offset to original information redefined in scheduling grant information in each of multiple configured time resource units.

With reference to the fourth aspect, in a sixth possible implementation of the fourth aspect, the time resource unit includes a subframe, a frame, a timeslot, and an OFDM symbol.

It can be learned from the foregoing technical solutions that the embodiments of the present disclosure have the following advantages In the embodiments of the present disclosure, first, the user equipment obtains the first time resource unit. Next, if the user equipment obtains, from the first time resource unit, the included scheduling grant information indicating the full-duplex transmission, the user equipment corrects, according to the power offset obtained by the user equipment, the first uplink transmission power used for the half-duplex transmission to obtain the second uplink transmission power used for the full-duplex transmission. Finally, the user equipment transmits the uplink signal in the first time resource unit or the second time resource unit according to the second uplink transmission power. The second time resource unit is a time resource unit that is after the first time resource unit in terms of time. The user equipment in the embodiments of the present disclosure may determine the second uplink transmission power according to the obtained power offset. Therefore, the uplink channel power control can be correctly set according to the second uplink transmission power obtained by correcting the first uplink transmission power when the user equipment determines to perform the full-duplex transmission. In this way, precise power control can be implemented, and self-interference can be accordingly avoided such that downlink data can be normally detected, and a system gain of full-duplex transmission in a wireless communications system is improved. The full-duplex transmission control method provided in the present disclosure may be applied to the LTE system and the WI-FI system.

DESCRIPTION OF EMBODIMENTS

Embodiments of the present disclosure provide a full-duplex transmission control method, user equipment, and a base station, are used to implement full-duplex transmission in an LTE system and a WI-FI system, and may implement uplink channel power control during the full-duplex transmission in order to improve a system gain of the full-duplex transmission.

To make the disclosure objectives, features, and advantages of the present disclosure clearer and more comprehensible, the following clearly and completely describes the technical solutions in the embodiments of the present disclosure with reference to the accompanying drawings in the embodiments of the present disclosure. The embodiments described in the following are merely some rather than all of the embodiments of the present disclosure. All other embodiments obtained by persons skilled in the art based on the embodiments of the present disclosure shall fall within the protection scope of the present disclosure.

In the specification, claims, and accompanying drawings of the present disclosure, the terms "first," "second," and so on are intended to distinguish between similar objects but do not necessarily describe a specific order or sequence. It should be understood that the terms used in such a way are interchangeable in proper circumstances, which is merely a discrimination manner that is used when objects having a same attribute are described in the embodiments of the present disclosure. In addition, the terms "include," "contain," and any other variants mean to cover the non-exclusive inclusion such that a process, method, system, product, or device that includes a series of units is not necessarily limited to those units, but may include other units not expressly listed or inherent to such a process, method, product, or device.

Details are described in the following.

Figure 1:
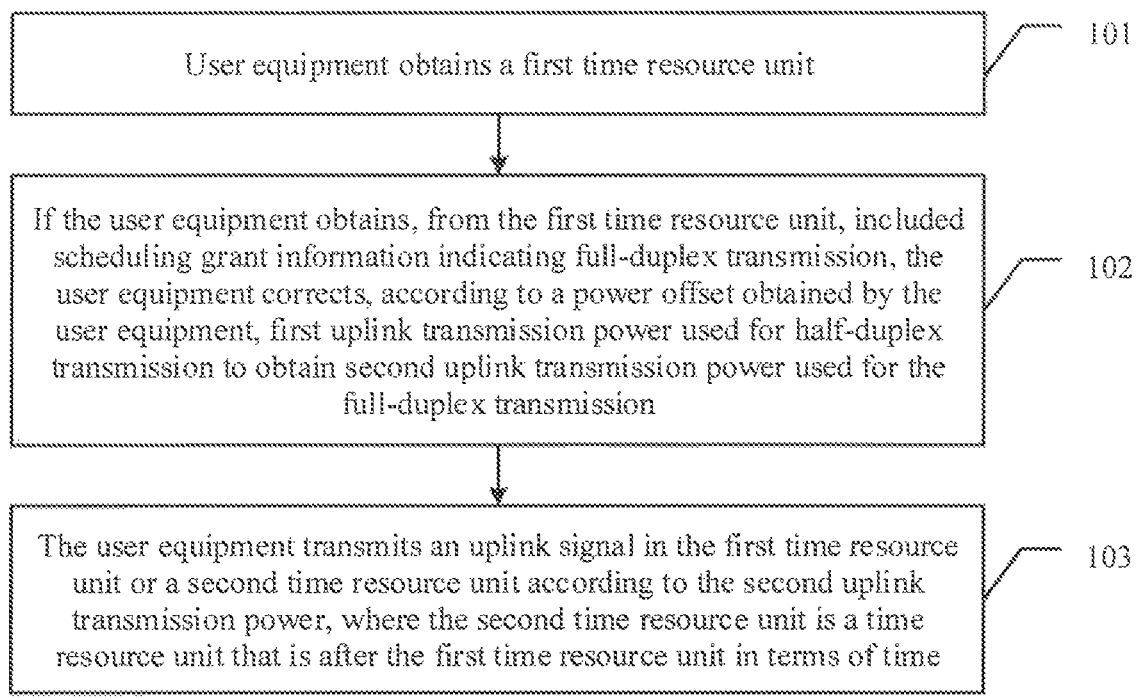
FIG. 1 is a schematic flowchart diagram of a procedure of a full-duplex transmission control method according to an embodiment of the present disclosure.

An embodiment of a full-duplex transmission control method in the present disclosure may be applied to a scenario in which a user equipment side implements uplink power control in full-duplex transmission. As shown in FIG. 1, a full-duplex transmission control method provided in an embodiment of the present disclosure may include the following steps.

Step 101: User equipment obtains a first time resource unit.

In this embodiment of the present disclosure, an example in which the user equipment controls full-duplex transmission in the first time resource unit is used. The user equipment first obtains the first time resource unit, and detects the first time resource unit to detect whether included scheduling grant information indicating the full-duplex transmission can be obtained from the first time resource unit. A possible implementation is as follows. The user equipment may detect a time resource unit header in the first time resource unit, and determine, using specific field information or a specific indication bit in the time resource unit header of the first time resource unit, whether the scheduling grant information indicating the full-duplex transmission is included. For another example, the user equipment may detect another time resource unit other than the first time resource unit, and determine, using indication information of the other time resource unit for the first time resource unit, whether the first time resource unit includes the scheduling grant information indicating the full-duplex transmission. For another example, the user equipment may detect signaling sent by a base station, and the user equipment determines, using the signaling sent by the base station, whether the first time resource unit includes the scheduling grant information indicating the full-duplex transmission. For another example, alternatively, the user equipment may determine, using predefined configuration information, whether the first time resource unit includes the scheduling grant information indicating the full-duplex transmission. For the first time resource unit that includes the scheduling grant information indicating the full-duplex transmission, the user equipment may perform the full-duplex transmission in the first time resource unit. For the first time resource unit that does not include the scheduling grant information indicating the full-duplex transmission, in the first time resource unit, the user equipment may perform half-duplex transmission, and no longer perform the full-duplex transmission. After detecting the first time resource unit that includes the scheduling grant information indicating the full-duplex transmission, the user equipment performs a subsequent step 102.

In some embodiments of the present disclosure, a time resource unit obtained by the user equipment in step 101 is the first time resource unit. The time resource unit may include a subframe, a frame, a timeslot, and an OFDM symbol. That is, a time resource unit described in some embodiments of the present disclosure may be a subframe. For example, a first time resource unit described in a subsequent embodiment is a first subframe, a second time resource resource unit is a fourth subframe, and a fifth time resource unit may be a fifth subframe. A time resource unit described in some other embodiments of the present disclosure may be a frame (that is, a radio frame). For example, a first time resource unit described in a subsequent embodiment is a first frame, a second time resource unit is a second frame, a third time resource unit may be a third frame, a fourth time resource unit is a fourth frame, and a fifth time resource unit may be a fifth frame. Alternatively, a time resource unit may be a timeslot. Alternatively, a time resource unit may be an OFDM symbol. It should be noted that a subframe, a frame, a timeslot, or an OFDM symbol may be selected as the time resource unit according to a requirement of an application scenario. This is not limited. In this embodiment of the present disclosure, a relationship among the subframe, the frame, the timeslot, and the OFDM symbol in a possible implementation is as follows:

1 subframe=10 subframes=10 ms=20 timeslots=140 OFDM symbols.

In some embodiments of the present disclosure, step 101 in which user equipment obtains a first time resource unit may further include the following steps.

Step A1: The user equipment detects, in a third time resource unit that is before the first time resource unit, whether there is uplink scheduling information indicating to perform transmission in the first time resource unit or a second time resource unit, and detects, in the first time resource unit or a fourth time resource unit that is before the first time resource unit, whether there is downlink scheduling information indicating to perform transmission in the first time resource unit or the second time resource unit, where the third time resource unit and the fourth time resource unit are two different time resource units.

Step A2: If the uplink scheduling information is detected in the third time resource unit, a quantity of time resource units between the first time resource unit and the third time resource unit meets a preconfigured difference value, and the downlink scheduling information is detected in the first time resource unit or the fourth time resource unit, determine that the first time resource unit includes the scheduling grant information indicating the full-duplex transmission.

Step A3: If the uplink scheduling information is not detected in the third time resource unit, a quantity of time resource units between the first time resource unit and the third time resource unit does not meet a preconfigured difference value, or the downlink scheduling information is not detected in the first time resource unit or the fourth time resource unit, determine that the first time resource unit does not include the scheduling grant information indicating the full-duplex transmission.

In an implementation of step A1 to step A3, the third time resource unit is a time resource unit that is before the first time resource unit, the fourth time resource unit is a time resource unit that is before the first time resource unit, and the third time resource unit and the fourth time resource unit are two different time resource units. The user equipment detects, in the third time resource unit that is before the first time resource unit, whether there is the uplink scheduling information in the third time resource unit. The uplink scheduling information is used to instruct to transmit uplink data information in the first time resource unit or the second time resource unit. For example, the user equipment detects a time resource unit header of the third time resource unit to learn whether there is the uplink scheduling information. In uplink scheduling, a preparation time needs to be occupied before a signal is transmitted. Therefore, if uplink transmission needs to be performed in the first time resource unit, the base station needs to send the uplink scheduling information in a time resource unit that is before the first time resource unit. In this embodiment of the present disclosure, the user equipment detects each time resource unit that is before the first time resource unit. For example, the user equipment may detect the third time resource unit that is before the first time resource unit. The user equipment determines whether there is the uplink scheduling information in the third time resource unit. If the user equipment detects, in the third time resource unit, the uplink scheduling information sent by the base station, it indicates that the user equipment may perform uplink scheduling transmission in a time resource unit that is after the third time resource unit.

In addition, the fourth time resource unit is a time resource unit that is before the first time resource unit. Both the fourth time resource unit and the third time resource unit are before the first time resource unit, but the fourth time resource unit and the third time resource unit are two different time resource units. The user equipment detects, in the first time resource unit or the fourth time resource unit, whether there is the downlink scheduling information indicating to perform transmission in the first time resource unit or the second time resource unit. That is, when the user equipment may determine whether the first time resource unit includes the scheduling grant information indicating the full-duplex transmission, the user equipment may detect the downlink scheduling information in the first time resource unit (that is, the first time resource unit) or in a time resource unit (for example, the fourth time resource unit) that is before the first time resource unit. The downlink scheduling information is used to instruct to transmit downlink data information in the first time resource unit or the second time resource unit. For example, the user equipment detects a time resource unit header of the fourth time resource unit to obtain whether there is the downlink scheduling information. If the user equipment detects, in the fourth time resource unit, the downlink scheduling information sent by the base station, it indicates that the user equipment may perform downlink scheduling transmission in a time resource unit that is after the fourth time resource unit.

In the implementation of step A1 to step A3, if the following three conditions are met, it indicates that the first time resource unit includes the scheduling grant information indicating the full-duplex transmission. The three conditions are as follows.

(1) The uplink scheduling information is detected in the third time resource unit.

(2) The quantity of time resource units between the first time resource unit and the third time resource unit is the preconfigured difference value.

For example, the difference value is four time resource units. That is, if the first time resource unit is an $n^{th}$ time resource unit, where n is a natural number, and if the uplink scheduling information is detected in an $(n-4)^{th}$ time resource unit, the third time resource unit is the $(n-4)^{th}$ time resource unit, and the quantity of time resource units between the first time resource unit and the third time resource unit is 4.

(3) The downlink scheduling information is detected in the first time resource unit or the fourth time resource unit.

When all the three conditions are met, the user equipment can determine that the $n^{th}$ time resource unit includes the scheduling grant information indicating the full-duplex transmission. If not all the condition (1), the condition (2), and the condition (3) can be met, it indicates that the first time resource unit does not include the scheduling grant information indicating the full-duplex transmission. For example, the uplink scheduling information is not detected in the third time resource unit, or the uplink scheduling information is detected in the third time resource unit, but the quantity of time resource units between the first time resource unit and the third time resource unit does not meet the preconfigured difference value, or the downlink scheduling information is not detected in the first time resource unit or the fourth time resource unit. In all the foregoing cases, it indicates that the first time resource unit does not include the scheduling grant information indicating the full-duplex transmission.

It can be learned from detection performed on the third time resource unit and detection performed on the first time resource unit or the fourth time resource unit in step A1 that, if the uplink scheduling information is detected in the third time resource unit, the quantity of time resource units between the first time resource unit and the third time resource unit meets the preconfigured difference value, and the downlink scheduling information is detected in the first time resource unit or the fourth time resource unit, in some embodiments of the present disclosure, after step A2 in which the user equipment detects, in a third time resource unit that is before the first time resource unit, whether there is uplink scheduling information indicating to perform transmission in the first time resource unit or a second time resource unit, the full-duplex transmission control method provided in this embodiment of the present disclosure may further include the following step.

Step A4: If a power offset included in the downlink scheduling information is a preconfigured offset value with a special definition, the user equipment cancels, according to the power offset included in the downlink scheduling information, uplink data information transmission that the uplink scheduling information in the third time resource unit instructs to perform in the first time resource unit or the second time resource unit.

In step A4, the downlink scheduling information is information transmitted in the first time resource unit or the fourth time resource unit. If the base station indicates, in the uplink scheduling information in the third time resource unit, the uplink data information transmission in the first time resource unit or the second time resource unit, when the base station needs to cancel the uplink data information transmission, the base station may set a value of the power offset included in the downlink scheduling information to the preconfigured offset value with a special definition such that after detecting the offset value with a special meaning, the user equipment cancels the uplink data information transmission indicated by the uplink scheduling information in the third time resource unit. In this case, after the user equipment detects the power offset from the first time resource unit or the fourth time resource unit, the user equipment finds that the power offset is the preconfigured offset value with a special definition, and the user equipment cancels the uplink data information transmission in the first time resource unit or the second time resource unit. For example, when the value of the power offset is a power offset value with a special definition, the user equipment cancels uplink transmission simultaneously performed in a same time resource unit as downlink transmission.

In some embodiments of the present disclosure, step 101 in which user equipment obtains a first time resource unit may further include the following steps.

Step B1: The user equipment detects, in the first time resource unit, whether there is uplink feedback information corresponding to the downlink data information transmission in a fifth time resource unit that is before the first time resource unit, and detects, in the first time resource unit or a fourth time resource unit that is before the first time resource unit, whether there is downlink scheduling information indicating to perform transmission in the first time resource unit or a second time resource unit.

Step B2: If the uplink feedback information corresponding to the downlink data information transmission in the fifth time resource unit is detected in the first time resource unit, a quantity of time resource units between the first time resource unit and the fifth time resource unit meets a preconfigured difference value, and the downlink scheduling information is detected in the first time resource unit or the fourth time resource unit, determine that the first time resource unit includes scheduling information indicating the full-duplex transmission, where the fourth time resource unit and the fifth time resource unit are two different time resource units.

Step B3: If the uplink feedback information is not detected in the first time resource unit, a quantity of time resource units between the first time resource unit and the fifth time resource unit does not meet a preconfigured difference value, or the downlink scheduling information is not detected in the first time resource unit or the fourth time resource unit, determine that the first time resource unit does not include information about the full-duplex transmission.

In an implementation of step B1 to step B3, the fifth time resource unit is a time resource unit that is before the first time resource unit. The user equipment detects, in the first time resource unit, whether there is the uplink feedback information. The uplink feedback information is feedback information corresponding to downlink data information transmitted in the fifth time resource unit. For example, the user equipment detects a time resource unit header of the first time resource unit to obtain whether there is the uplink feedback information. The uplink feedback information may be acknowledgement (ACK) information or negative ACK (NACK) information. This further depends on a receiving status of receiving the downlink data information by the user equipment in the fifth time resource unit. In this embodiment of the present disclosure, the user equipment performs detection in the first time resource unit, and the user equipment determines whether there is the uplink feedback information in the first time resource unit. If the user equipment detects the uplink feedback information in the first time resource unit, it indicates that the user equipment may perform uplink scheduling transmission in the first time resource unit.

In addition, the fourth time resource unit is a time resource unit that is before the first time resource unit. Both the fourth time resource unit and the fifth time resource unit are before the first time resource unit, but the fourth time resource unit and the fifth time resource unit are two different time resource units. The user equipment detects, in the first time resource unit or the fourth time resource unit, whether there is the downlink scheduling information indicating to perform transmission in the first time resource unit or the second time resource unit. That is, when the user equipment may determine whether the first time resource unit includes the scheduling grant information indicating the full-duplex transmission, the user equipment may detect the downlink scheduling information in the first time this time resource unit (that is, the first time resource unit) or in a time resource unit (for example, the fourth time resource unit) that is before the first time this time resource unit. The downlink scheduling information is used to instruct to transmit downlink data information in the first time resource unit or the second time resource unit. For example, the user equipment detects a time resource unit header of the fourth time resource unit to obtain whether there is the downlink scheduling information. If the user equipment detects, in the fourth time resource unit, the downlink scheduling information sent by the base station, it indicates that the user equipment may perform downlink scheduling transmission in a time resource unit that is after the fourth time resource unit.

In the implementation of step B1 to step B3, if the following three conditions are met, it indicates that the first time resource unit includes the scheduling grant information indicating the full-duplex transmission. The three conditions are as follows.

(X) The uplink feedback information is detected in the first time resource unit.

(Y) The quantity of time resource units between the first time resource unit and the fifth time resource unit is the preconfigured difference value.

For example, the difference value is two time resource units. That is, if the first time resource unit is an $n^{th}$ time resource unit, where n is a natural number, and if downlink data information is detected in an $(n-2)^{th}$ time resource unit, and uplink feedback information corresponding to the downlink data information is detected in the $n^{th}$ time resource unit, the fifth time resource unit is the $(n-2)^{th}$ time resource unit, and the quantity of time resource units between the first time resource unit and the fifth time resource unit is 2.

(Z) The downlink scheduling information is detected in the first time resource unit or the fourth time resource unit. When all the three conditions are met, the user equipment can determine that the $n^{th}$ time resource unit includes the scheduling grant information indicating the full-duplex transmission. If not all the condition (X), the condition (Y), and the condition (Z) can be met, it indicates that the first time resource unit does not include the scheduling grant information indicating the full-duplex transmission. For example, the uplink feedback information is not detected in the first time resource unit, or the quantity of time resource units between the first time resource unit and the fifth time resource unit does not meet the preconfigured difference value, or the downlink scheduling information is not detected in the first time resource unit or the fourth time resource unit. In all the foregoing cases, it indicates that the first time resource unit does not include the scheduling grant information indicating the full-duplex transmission.

In some embodiments of the present disclosure, step 101 in which user equipment obtains a first time resource unit may further include the following steps.

Step C1: The user equipment detects, in the first time resource unit, whether there are uplink scheduling information and downlink scheduling information.

Step C2: If both the uplink scheduling information and the downlink scheduling information are detected in the first time resource unit, determine that the first time resource unit includes the scheduling grant information indicating the full-duplex transmission.

Step C3: If at most one piece of scheduling information in the uplink scheduling information or the downlink scheduling information is detected in the first time resource unit, determine that the first time resource unit does not include the scheduling grant information indicating the full-duplex transmission.

In an implementation of steps C1 to C3, the user equipment needs to detect only the first time resource unit. Further, the user equipment needs to detect whether the first time resource unit includes both the uplink scheduling information and the downlink scheduling information. In the implementation of steps C1 to C3, in the full-duplex transmission, an uplink transmission resource and a downlink transmission resource may be simultaneously scheduled to simultaneously implement signal sending and receiving. For example, in a physical downlink control channel (PDCCH), an uplink resource and a downlink resource that are simultaneously transmitted are allocated to the user equipment to implement the full-duplex transmission. In this manner, it may be detected, using one piece of single scheduling grant information, whether the first time resource unit can be used for the full-duplex transmission. The first time resource unit is detected to determine whether the first time resource unit includes the scheduling grant information. For example, the user equipment detects whether the first time resource unit includes both the uplink scheduling information and the downlink scheduling information. If both the uplink scheduling information and the downlink scheduling information are detected in the first time resource unit, the user equipment can determine that the first time resource unit can be used for the full-duplex transmission. If at most one piece of the uplink scheduling information or the downlink scheduling information is detected in the first time resource unit, the user equipment determines that the first time resource unit cannot be used for the full-duplex transmission, that is, the first time resource unit does not include the scheduling grant information indicating the full-duplex transmission.

In the foregoing described embodiment, the uplink scheduling information may be uplink grant information, and the downlink scheduling information may be downlink grant information. The uplink grant information and the downlink grant information may be as follows. The uplink grant information includes a time and a carrier (such as a physical resource block) for transmitting data by the user equipment, and a used MCS. It is one piece of content in the PDCCH. The downlink grant information is that the base station dynamically allocates a resource to the user equipment at each transmission time interval (TTI) (that is, a time resource unit), including a physical resource block and a used MCS. It is one piece of content in the PDCCH. In addition, the uplink scheduling information and the downlink scheduling information may be other preconfigured control information, provided that the user equipment side can detect indication content carried in the uplink scheduling information and the downlink scheduling information.

Step 102: If the user equipment obtains, from the first time resource unit, included scheduling grant information indicating full-duplex transmission, the user equipment corrects, according to a power offset obtained by the user equipment, first uplink transmission power used for half-duplex transmission to obtain second uplink transmission power used for the full-duplex transmission.

In this embodiment of the present disclosure, if the user equipment obtains the first time resource unit using step 101, and obtains, from the first time resource unit, the included scheduling grant information indicating the full-duplex transmission, the user equipment determines that the first time resource unit can be used to perform the full-duplex transmission. When the full-duplex transmission needs to be performed in the first time resource unit, transmission power for uplink transmission in the full-duplex transmission may be obtained by correcting, using the power offset obtained by the user equipment, the first uplink transmission power used for the half-duplex transmission. Further, the user equipment may use a predefined power offset to correct the first uplink transmission power used for the half-duplex transmission to obtain the second uplink transmission power used for the full-duplex transmission. Alternatively, the user equipment may use a power offset detected from the first time resource unit or another preconfigured time resource unit. That is, the power offset obtained by the user equipment is a power offset predefined by the user equipment or a power offset obtained by the user equipment using the scheduling grant information sent by the base station. The power offset is an offset power value for modifying, in the full-duplex transmission, the first uplink transmission power used for the half-duplex transmission. In addition, in this embodiment of the present disclosure, the first uplink transmission power is uplink transmission power used by the user equipment when only uplink transmission is performed but downlink transmission is not performed, that is, the first uplink transmission power is uplink transmission power obtained by the user equipment for the half-duplex transmission.

In some embodiments of the present disclosure, in the implementation of performing steps A1 to A3 or the implementation of performing steps B1 to B3, before step 102 in which the user equipment corrects, according to a power offset obtained by the user equipment, first uplink transmission power used for half-duplex transmission, the full-duplex transmission control method provided in this embodiment of the present disclosure may further include the following steps.

Step D1: The user equipment obtains, from the uplink scheduling information in the third time resource unit, the first uplink transmission power used for the half-duplex transmission, or the user equipment obtains, from the fifth time resource unit, the first uplink transmission power used for the half-duplex transmission.

Step D2: The user equipment obtains the power offset in a predefined manner, or obtains the power offset from the first time resource unit or the fourth time resource unit.

A manner in which the user equipment obtains the first uplink transmission power is described in step D1. The user equipment may obtain the first uplink transmission power from a time resource unit that is before the first time resource unit, for example, obtain the first uplink transmission power from the third time resource unit or the fifth time resource unit. In step 102, the user equipment further needs to use the power offset when calculating the second uplink transmission power. A manner in which the user equipment obtains the power offset is described in step D2. The user equipment may obtain the power offset in the predefined manner. In addition, the base station may send the power offset in the first time resource unit or the fourth time resource unit, and the user equipment may obtain the power offset from the first time resource unit or the fourth time resource unit.

In some embodiments of the present disclosure, the power offset is obtained by the user equipment in the predefined manner, the power offset is detected by the user equipment from downlink scheduling information in the first time resource unit, or the power offset is detected by the user equipment from scheduling grant information in each of multiple configured time resource units. The multiple configured time resource units are a subset of a set of all grant time resource units in which full-duplex transmission can be detected. The multiple configured time resource units may be a set of multiple time resource units that is specified by the base station. In this case, the multiple configured time resource units are a subset of the set of all grant time resource units in which full-duplex transmission can be detected, that is, the multiple configured time resource units may be a time resource unit set, and the time resource unit set is a subset of the set of grant time resource units in which full-duplex transmission can be detected. The base station does not need to add the power offset to each time resource unit. This increases system overheads. The base station is preconfigured to add the power offset to each time resource unit in the time resource unit set. The user equipment only needs to detect the power offset in each time resource unit in the time resource unit set configured by the base station, and the user equipment does not detect the power offset outside the time resource unit set.

Therefore, the user equipment only detects whether each time resource unit in the time resource unit set carries the power offset, and does not detect whether a time resource unit outside the time resource unit set carries the power offset. Therefore, in this embodiment of the present disclosure, the user equipment detects the power offset only in all time resource units in the time resource unit set, and the user equipment does not need to detect the power offset in the time resource unit outside the time resource unit set. Therefore, the user equipment detects, only in the time resource unit in the time resource unit set, whether the power offset is carried. In this way, excessive load is not caused.

In the foregoing implementation scenario, before step 102 in which the user equipment corrects, according to a power offset obtained by the user equipment, first uplink transmission power used for half-duplex transmission, the full-duplex transmission control method provided in this embodiment of the present disclosure may further include the following step, where if the power offset is obtained by the user equipment in the predefined manner, when detecting corresponding trigger signaling from the scheduling grant information in the first time resource unit or that in a time resource unit that is before the first time resource unit, triggering, by the user equipment, the power offset to come into effect.

In the foregoing description, if the power offset is obtained by the user equipment in the predefined manner, the user equipment further needs the trigger signaling sent by the base station to trigger the power offset to come into effect. The trigger signaling is added by the base station to the scheduling grant information in the first time resource unit or that in a time resource unit that is before the first time resource unit. When obtaining the trigger signaling corresponding to the scheduling grant information, the user equipment may trigger the power offset to come into effect.

Further, in some embodiments of the present disclosure, that the power offset is obtained by the user equipment in a predefined manner may include the following steps of receiving, by the user equipment, broadcast signaling or dedicated signaling sent by a base station, and obtaining, by the user equipment, the power offset using the broadcast signaling or dedicated signaling.

The predefined manner of the power offset may be as follows. The base station sends the power offset using the broadcast signaling or dedicated signaling. After the user equipment receives the power offset using the broadcast signaling or dedicated signaling, the user equipment may save the power offset to trigger, when receiving the trigger signaling for the power offset, the power offset to come into effect. The dedicated signaling sent by the base station may be preconfigured radio resource control (RRC) signaling. In addition, the dedicated signaling may be other signaling known to the base station and the user equipment.

Further, in some embodiments of the present disclosure, that the power offset is detected by the user equipment from the scheduling grant information in the first time resource unit, or the power offset is detected by the user equipment from scheduling grant information in each of multiple configured time resource units may include the following step of detecting, by the user equipment, the power offset from information newly added to the scheduling grant information, or detecting, by the user equipment, the power offset from original information redefined in the scheduling grant information.

That is, when the power offset is obtained by the user equipment by means of detection, the base station may set the power offset in the following manner such that the user equipment detects the power offset from the scheduling grant information. For example, the base station may newly add information to the scheduling grant information, and add the power offset to the newly added information. In this case, the user equipment may detect the information newly added to the scheduling grant information. For another example, the base station may redefine the original information in the scheduling grant information. In this case, the redefined original information may be used to carry the power offset. Therefore, the user equipment may detect the original information redefined in the scheduling grant information.

In some embodiments of the present disclosure, step 102 in which the user equipment corrects, according to a power offset obtained by the user equipment, first uplink transmission power used for half-duplex transmission, to obtain second uplink transmission power used for the full-duplex transmission may further include the following step of calculating, by the user equipment in the following manner, the second uplink transmission power used for the full-duplex transmission $$P_{FD}=P_{HD}-P_{offset},$$

where $P_{FD}$ the second uplink transmission power, $P_{HD}$ is the first uplink transmission power, and $P_{offset}$ is the power offset obtained by the user equipment.

That is, the user equipment may perform an operation on the first uplink transmission power using the power offset, that is, subtract the power offset from the first uplink transmission power in order to obtain the second uplink transmission power. It should be noted that in another embodiment of the present disclosure, the first uplink transmission power may be corrected according to the power offset in another manner. For example, the second uplink transmission power used for the half-duplex transmission may be calculated by multiplying a preconfigured ratio value by a value that is obtained by subtracting the power offset from the first uplink transmission power, or by subtracting a preconfigured compensation value from a value that is obtained by subtracting the power offset from the first uplink transmission power. A specific implementation may be combined with a requirement of an application scenario. Merely illustration is provided herein.

Further, a PUSCH is used as an example. Step 102 may include the following step of calculating, in the following manner, the second uplink transmission power used for the full-duplex transmission:

$$P_{FD}(n)=P_{PUSCH}(n)-P_{offset}(n),$$

where an $n^{th}$ time resource unit is the first time resource unit, $P_{FD}(n)$ is the second uplink transmission power, $P_{PUSCH}(n)$ is the first uplink transmission power used to perform the half-duplex transmission in the PUSCH, and $P_{offset}(n)$ is the power offset obtained by the user equipment.

Further, a PUCCH is used as an example. Step 102 may further include the following step of calculating, in the following manner, the second uplink transmission power used for the full-duplex transmission:

$$P_{FD}(n)=P_{PUCCH}(n)-P_{offset}(n),$$

where an $n^{th}$ time resource unit is the first time resource unit, $P_{FD}(n)$ is the second uplink transmission power, $P_{PUCCH}(n)$ is the first uplink transmission power used to perform the half-duplex transmission in the PUCCH, and $P_{offset}(n)$ is the power offset obtained by the user equipment.

In some embodiments of the present disclosure, after step 102 in which the user equipment corrects, according to a power offset obtained by the user equipment, first uplink transmission power used for half-duplex transmission, the full-duplex transmission control method provided in this embodiment of the present disclosure may further include the following steps.

Step E1: The user equipment obtains an MCS offset that matches the power offset.

Step E2: The user equipment corrects, according to the MCS offset, a first MCS index used for the half-duplex transmission to obtain a second MCS index used for the full-duplex transmission.

In this embodiment of the present disclosure, the power offset may match the MCS offset, that is, using a power offset, an MCS offset corresponding to the power offset may be obtained. An MCS may represent uplink channel quality. Different code rates of control parts may be determined according to an MCS used in an uplink channel, that is, a quantity of resource blocks occupied by each part is determined. The base station may notify the user equipment of the MCS offset using explicit signaling, and the user equipment may obtain the power offset using the explicit signaling. Alternatively, the user equipment may obtain the MCS offset using a matching relationship between the MCS offset and the power offset. After obtaining the MCS offset, the user equipment may correct the first MCS index according to the MCS offset to obtain the second MCS index that may be used for the full-duplex transmission.

In some embodiments of the present disclosure, step E1 in which the user equipment obtains an MCS offset that matches the power offset may further include the following step.

Step E11: The user equipment receives the MCS offset using broadcast signaling or dedicated signaling; or Step E12: The user equipment obtains the MCS offset using a predefined mutual matching relationship between the power offset and the MCS offset.

The user equipment may obtain the MCS offset using the broadcast signaling or dedicated signaling. The broadcast signaling or dedicated signaling is configured by the base station. The user equipment may obtain the MCS offset when the base station sends the MCS offset using the broadcast signaling or dedicated signaling. For example, the dedicated signaling configured by the base station may be RRC signaling. In addition, there is the mutual matching relationship between the power offset and the MCS offset. The MCS offset may be obtained according to the predefined mutual matching relationship. For example, the MCS offset that matches the power offset may be indicated using explicit signaling or indicated using implicit signaling. Explicit signaling indication is that when the power offset is notified, the MCS offset is specially and explicitly indicated using an additional bit. Implicit signaling indication is that when the power offset is notified, the MCS offset does not need to be specially indicated using an additional bit, but the MCS offset is obtained using predefined mutual matching.

A PUSCH is used as an example. Step E2 may further include the following step of calculating, in the following manner, the second MCS index used for the full-duplex transmission:

$$MCS_{FD}(n)=MCS_{PUSCH}(n)-MCS_{offset}(n),$$

where an $n^{th}$ time resource unit is the first time resource unit, $MCS_{FD}(n)$ is the second MCS index $MCS_{PUSCH}(n)$ is the first MCS index used to perform the half-duplex transmission in the PUCCH, and $MCS_{offset}(n)$ is the MCS offset obtained by the user equipment.

That is, the user equipment may perform an operation on the first MCS index using the MCS offset, that is, subtract the MCS offset from the first MCS index in order to obtain the second MCS index. It should be noted that in another embodiment of the present disclosure, the first MCS index may be corrected according to the MCS offset in another manner. For example, the second MCS index used for the half-duplex transmission may be calculated by multiplying a preconfigured ratio value by a value that is obtained by subtracting the MCS offset from the first MCS index, or by subtracting a preconfigured compensation value from a value that is obtained by subtracting the MCS offset from the first MCS index. A specific implementation may be combined with a requirement of an application scenario. Merely illustration is provided herein.

Step 103: The user equipment transmits an uplink signal in the first time resource unit or a second time resource unit according to the second uplink transmission power, where the second time resource unit is a time resource unit that is after the first time resource unit in terms of time.

In this embodiment of the present disclosure, the user equipment obtains, from the first time resource unit, the included scheduling grant information indicating the full-duplex transmission. The user equipment obtains the second uplink transmission power used for the full-duplex transmission. In this case, the second uplink transmission power may be used to transmit the uplink signal in the first time resource unit or the second time resource unit that is after the first time resource unit. In this embodiment of the present disclosure, when the full-duplex transmission is performed in the first time resource unit or the second time resource unit, the uplink signal may be transmitted according to the second uplink transmission power determined in step 102 such that uplink channel power control can be correctly set. Precise power control can avoid self-interference such that downlink data can be normally detected, and a system gain of full-duplex transmission implemented in an LTE system and a WI-FI system is improved.

In some embodiments of the present disclosure, in an implementation scenario in which steps A1 to A3 and steps B1 to B3 are performed, the uplink signal in step 103 is uplink data information that the uplink scheduling information in the third time resource unit instructs to transmit in the first time resource unit or the second time resource unit. Alternatively, the uplink signal is the uplink feedback information that is in the first time resource unit and that is corresponding to the downlink data information in the fifth time resource unit. The uplink feedback information may be ACK information or NACK information. For example, a PDSCH is used as an example. The user equipment detects the downlink data information in the fifth time resource unit. The user equipment needs to feedback ACK information or NACK information in the first time resource unit according to the downlink data information. Before the user equipment feeds back the ACK information or NACK information, the user equipment may further detect the downlink scheduling information in the first time resource unit. If the downlink scheduling information is also detected in the first time resource unit, it indicates that the user equipment may perform the full-duplex transmission in the first time resource unit. The user equipment adjusts, to the second uplink transmission power, transmission power that can be used for the ACK information or NACK information.

It can be learned from the description of the present disclosure in this embodiment that, first, the user equipment obtains the first time resource unit. Next, if the user equipment obtains, from the first time resource unit, the included scheduling grant information indicating the full-duplex transmission, the user equipment corrects, according to the power offset obtained by the user equipment, the first uplink transmission power used for the half-duplex transmission to obtain the second uplink transmission power used for the full-duplex transmission. Finally, the user equipment transmits the uplink signal in the first time resource unit or the second time resource unit according to the second uplink transmission power. The second time resource unit is a time resource unit that is after the first time resource unit. The user equipment in this embodiment of the present disclosure may determine the second uplink transmission power using the preconfigured power offset. Therefore, the uplink channel power control can be correctly set according to the second uplink transmission power obtained by correcting the first uplink transmission power when the user equipment determines to perform the full-duplex transmission. In this way, the precise power control can be implemented, and self-interference can be accordingly avoided such that the downlink data can be normally detected, and a system gain of full-duplex transmission in a wireless communications system is improved. The method provided in the present disclosure may be applied to the LTE system and the WI-FI system.

Figure 2:
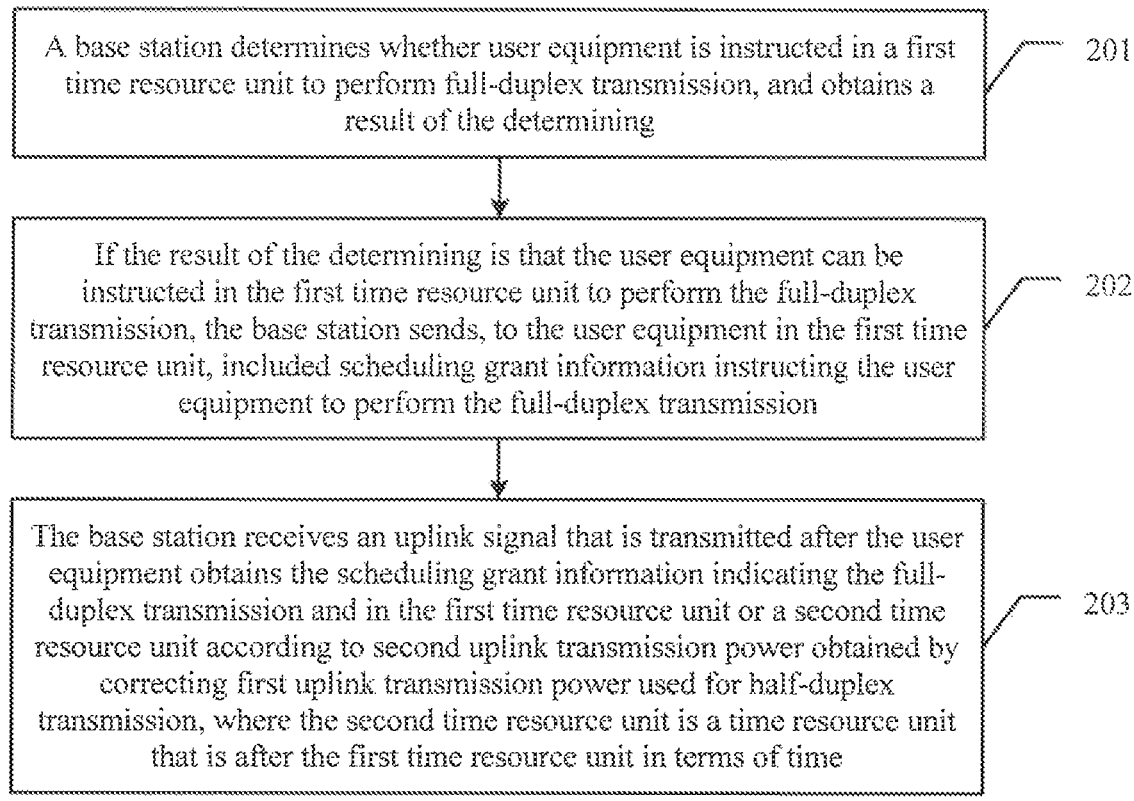
FIG. 2 is a schematic flowchart diagram of a procedure of another full-duplex transmission control method according to an embodiment of the present disclosure.

The foregoing embodiment describes, from the user equipment side, the full-duplex transmission control method provided in the present disclosure. The following describes, from a base station side, a full-duplex transmission control method provided in the present disclosure. As shown in FIG. 2, a full-duplex transmission control method provided in an embodiment of the present disclosure may include the following steps.

Step 201: A base station determines whether user equipment is instructed in a first time resource unit to perform full-duplex transmission, and obtains a result of the determining.

In this embodiment of the present disclosure, an example in which the base station controls the full-duplex transmission in the first time resource unit is used. The base station determines the first time resource unit on which control processing needs to be performed, determines whether the user equipment is instructed in the first time resource unit to perform the full-duplex transmission, and obtains the result of the determining. The result of the determining has two cases. In one case, the result of the determining is that the user equipment can be instructed in the first time resource unit to perform the full-duplex transmission. In this case, performing step 202 may be triggered. In the other case, the result of the determining is that the user equipment cannot be instructed in the first time resource unit to perform the full-duplex transmission. In this case, the base station does not instruct the user equipment in a first subframe to perform the full-duplex transmission. A possible implementation is as follows. The base station may determine, using specific transmission in the first time resource unit, whether the user equipment is instructed in the first time resource unit to perform the full-duplex transmission, or the base station may determine, using specific transmission in another time resource unit that is before the first time resource unit, whether the user equipment is instructed in the first time resource unit to perform the full-duplex transmission. After the base station determines whether the user equipment is instructed in the first time resource unit to perform the full-duplex transmission, the user equipment may obtain indication information, indicated by the base station, of whether the full-duplex transmission can be performed, and the user equipment may further determine whether to perform the full-duplex transmission in the first time resource unit or a second time resource unit. It should be noted that, if in step 201, the base station determines whether the user equipment can perform the full-duplex transmission in the second time resource unit, the user equipment may obtain indication information, indicated by the base station, of whether the full-duplex transmission can be performed, and the user equipment may further determine whether to perform the full-duplex transmission in the second time resource unit.

In some embodiments of the present disclosure, a time resource unit obtained by the base station in step 201 is the first time resource unit. The time resource unit may include a subframe, a frame, a timeslot, and an OFDM symbol. That is, a time resource unit described in some embodiments of the present disclosure may be a subframe. For example, a first time resource unit described in a subsequent embodiment is a first subframe, a second time resource unit is a second subframe, a third time resource unit may be a third subframe, a fourth time resource unit is a fourth subframe, and a fifth time resource unit may be a fifth subframe. A time resource unit described in some other embodiments of the present disclosure may be a frame (that is, a radio frame). For example, a first time resource unit described in a subsequent embodiment is a first frame, a second time resource unit is a second frame, a third time resource unit may be a third frame, a fourth time resource unit is a fourth frame, and a fifth time resource unit may be a fifth frame. Alternatively, a time resource unit may be a timeslot. Alternatively, a time resource unit may be an OFDM symbol. It should be noted that a subframe, a frame, a timeslot, or an OFDM symbol may be selected as the time resource unit according to a requirement of an application scenario. This is not limited.

In some embodiments of the present disclosure, step 201 in which a base station determines whether user equipment is instructed in a first time resource unit to perform full-duplex transmission may further include the following steps.

Step F1: If the base station transmits, in a third time resource unit that is before the first time resource unit, uplink scheduling information indicating to perform transmission in the first time resource unit or a second time resource unit, and the base station transmits, in the first time resource unit or a fourth time resource unit that is before the first time resource unit, downlink scheduling information indicating to perform transmission in the first time resource unit or the second time resource unit, the base station determines that the user equipment can perform the full-duplex transmission in the first time resource unit, where the third time resource unit and the fourth time resource unit are two different time resource units.

Step F2: If the base station does not transmit the uplink scheduling information in the third time resource unit, the base station determines that a quantity of time resource units between the first time resource unit and the third time resource unit does not meet a preconfigured difference value, or the base station does not detect the downlink scheduling information in the first time resource unit or the fourth time resource unit, the base station determines that the user equipment cannot perform the full-duplex transmission in the first time resource unit.

The third time resource unit is a time resource unit that is before the first time resource unit, the fourth time resource unit is a time resource unit that is before the first time resource unit, and the third time resource unit and the fourth time resource unit are two different time resource units. The base station transmits the uplink scheduling information in the third time resource unit that is before the first time resource unit. The uplink scheduling information is used to instruct to transmit uplink data information in the first time resource unit or the second time resource unit. The fourth time resource unit is a time resource unit that is before the first time resource unit. Both the fourth time resource unit and the third time resource unit are before the first time resource unit, but the fourth time resource unit and the third time resource unit are two different time resource units. The base station transmits the downlink scheduling information in the first time resource unit or the fourth time resource unit. When the foregoing conditions are met, it indicates that the base station confirms that the user equipment can be instructed in the first time resource unit to perform the full-duplex transmission.

Further, in some embodiments of the present disclosure, the downlink scheduling information includes a preconfigured offset value with a special definition, and the user equipment cancels, according to a power offset included in the downlink scheduling information, uplink data information transmission that the uplink scheduling information in the third time resource unit instructs to perform in the first time resource unit or the second time resource unit.

The downlink scheduling information is information transmitted in the first time resource unit or the fourth time resource unit. If the base station indicates, in the uplink scheduling information in the third time resource unit, the uplink data information transmission in the first time resource unit or the second time resource unit, when the base station needs to cancel the uplink data information transmission, the base station may set a value of the power offset included in the downlink scheduling information to the preconfigured offset value with a special definition such that after detecting the offset value with a special meaning, the user equipment cancels the uplink data transmission indicated by the uplink scheduling information in the third time resource unit. In this case, after the user equipment detects the power offset from the first time resource unit or the fourth time resource unit, the user equipment finds that the power offset is the preconfigured offset value with a special definition, and the user equipment cancels the uplink data information transmission in the first time resource unit or the second time resource unit. For example, when the value of the power offset is a power offset value with a special definition, the user equipment cancels uplink transmission simultaneously performed in a same time resource unit as downlink transmission.

In some embodiments of the present disclosure, step 201 in which a base station determines whether user equipment is instructed in a first time resource unit to perform full-duplex transmission may further include the following steps.

Step G1: If the base station transmits, in the first time resource unit, uplink feedback information corresponding to the downlink data information transmission in a fifth time resource unit that is before the first time resource unit, and the base station transmits, in the first time resource unit or a fourth time resource unit that is before the first time resource unit, downlink scheduling information indicating to perform transmission in the first time resource unit or a second time resource unit, the base station determines that the user equipment can perform the full-duplex transmission in the first time resource unit, where the fourth time resource unit and the fifth time resource unit are two different time resource units.

Step G2: If the base station does not transmit the uplink feedback information in the first time resource unit, the base station determines that a quantity of time resource units between the first time resource unit and the fifth time resource unit does not meet a preconfigured difference value, or the base station does not detect the downlink scheduling information in the first time resource unit or the fourth time resource unit, the base station determines that the user equipment can perform the full-duplex transmission in the first time resource unit.

The fifth time resource unit is a time resource unit that is before the first time resource unit, the fourth time resource unit is a time resource unit that is before the first time resource unit, and the fifth time resource unit and the fourth time resource unit are two different time resource units. The base station transmits downlink data information in the fifth time resource unit that is before the first time resource unit. The base station transmits, in the first time resource unit, the uplink feedback information corresponding to the downlink data information. The fourth time resource unit is a time resource unit that is before the first time resource unit. Both the fourth time resource unit and the fifth time resource unit are before the first time resource unit, but the fourth time resource unit and the third time resource unit are two different time resource units. The base station transmits the downlink scheduling information in the first time resource unit or the fourth time resource unit. When the foregoing conditions are met, it indicates that the base station confirms that the user equipment can be instructed in the first time resource unit to perform the full-duplex transmission.

In some embodiments of the present disclosure, before step 201 in which a base station determines whether user equipment is instructed in a first time resource unit to perform full-duplex transmission, the full-duplex transmission control method provided in this embodiment of the present disclosure further includes the following step.

Step H1: The base station sends broadcast signaling or dedicated signaling to the user equipment, where the broadcast signaling or dedicated signaling includes a power offset and/or an MCS offset that are/is configured by the base station.

A predefined manner of the power offset may be as follows. The base station sends the power offset and/or the MCS offset using the broadcast signaling or dedicated signaling. After the base station sends the power offset and/or the MCS offset using the broadcast signaling or dedicated signaling, the user equipment may receive the power offset and/or the MCS offset using the broadcast signaling or dedicated signaling, and then may save the power offset and/or the MCS offset in order to trigger, when receiving trigger signaling for the power offset and/or the MCS offset, the power offset and/or the MCS offset to come into effect. The dedicated signaling sent by the base station may be preconfigured RRC signaling. In addition, the dedicated signaling may be other signaling known to the base station and the user equipment.

In some embodiments of the present disclosure, before step 201 in which a base station determines whether user equipment is instructed in a first time resource unit to perform full-duplex transmission, the full-duplex transmission control method provided in this embodiment of the present disclosure further includes the following step.

Step I1: The base station newly adds information to the scheduling grant information in the first time resource unit to carry a power offset, the base station adds a power offset to original information redefined in the scheduling grant information in the first time resource unit, the base station newly adds information to scheduling grant information in each of multiple configured time resource units to carry a power offset, or the base station adds a power offset to original information redefined in scheduling grant information in each of multiple configured time resource units.

That is, in an implementation in which the power offset is sent by the base station to the user equipment, the base station may set the power offset in the following manner such that the user equipment detects the power offset from the scheduling grant information. For example, the base station may newly add information to the scheduling grant information, and add the power offset to the newly added information. In this case, the user equipment may detect the information newly added to the scheduling grant information. For another example, the base station may redefine the original information in the scheduling grant information. In this case, the redefined original information may be used to carry the power offset. Therefore, the user equipment may detect the original information redefined in the scheduling grant information.

Step 202: If the result of the determining is that the user equipment can be instructed in the first time resource unit to perform the full-duplex transmission, the base station sends, to the user equipment in the first time resource unit, included scheduling grant information indicating the user equipment to perform the full-duplex transmission.

In this embodiment of the present disclosure, it can be learned from the result of the determining obtained in step 201 that, if the result of the determining is that the user equipment can be instructed in the first time resource unit to perform the full-duplex transmission, it indicates that the base station can instruct, in the first time resource unit, the user equipment to perform the full-duplex transmission. The base station may send, to the user equipment in the first time resource unit, the included scheduling grant information indicating the user equipment to perform the full-duplex transmission. The user equipment performs detection on the scheduling grant information in the first time resource unit.

Step 203: The base station receives an uplink signal that is transmitted after the user equipment obtains the scheduling grant information indicating the full-duplex transmission and in the first time resource unit or a second time resource unit according to second uplink transmission power obtained by correcting first uplink transmission power used for half-duplex transmission, where the second time resource unit is a time resource unit that is after the first time resource unit in terms of time.

In this embodiment of the present disclosure, when the user equipment obtains, in the first time resource unit, an indication of the base station indicating that the user equipment can perform the full-duplex transmission, the user equipment corrects, according to the obtained power offset, the first uplink transmission power used for the half-duplex transmission, to obtain the second uplink transmission power used for the full-duplex transmission. When performing the full-duplex transmission in the first time resource unit or the second time resource unit, the user equipment may transmit the uplink signal according to the second uplink transmission power obtained by correcting the first uplink transmission power. The base station may receive the uplink signal transmitted by the user equipment in the first time resource unit or the second time resource unit. Because the second uplink transmission power used by the user equipment is set according to whether the user equipment performs the full-duplex transmission, precise power control can be implemented using the second uplink transmission power, and self-interference can be accordingly avoided such that downlink data can be normally detected, and a system gain of full-duplex transmission implemented in an LTE system and a WI-FI system is improved.

It can be learned from the description of the present disclosure in this embodiment that, the base station determines whether the user equipment can be instructed in the first time resource unit to perform the full-duplex transmission, and obtains the result of the determining. If the result of the determining is that the user equipment can be instructed in the first time resource unit to perform the full-duplex transmission, the base station sends, to the user equipment in the first time resource unit, the included scheduling grant information indicating the user equipment to perform the full-duplex transmission. The base station receives the uplink signal that is transmitted after the user equipment obtains the scheduling grant information indicating the full-duplex transmission and in the first time resource unit or the second time resource unit according to the second uplink transmission power obtained by correcting the first uplink transmission power used for the half-duplex transmission. The second time resource unit is a time resource unit that is after the first time resource unit in terms of time. The user equipment in this embodiment of the present disclosure may determine the second uplink transmission power using the preconfigured power offset. Therefore, uplink channel power control can be correctly set according to the second uplink transmission power obtained by correcting the first uplink transmission power when the user equipment determines to perform the full-duplex transmission. In this way, the precise power control can be implemented, and the self-interference can be accordingly avoided such that the downlink data can be normally detected, and a system gain of full-duplex transmission in a wireless communications system is improved. The method provided in the present disclosure may be applied to the LTE system and the WI-FI system.

To better understand and implement the foregoing solutions in this embodiment of the present disclosure, the following uses a corresponding application scenario as an example for detailed description.

In this embodiment of the present disclosure, a solution of an effective full-duplex power control operation is implemented separately based on uplink grant scheduling and downlink grant scheduling. For user equipment that can perform full-duplex transmission, a power offset (i.e., $P_{offset}$) introduced. The power offset is used to define a power difference value between the first uplink transmission power $P_{PUSCH}$ (or $P_{PUCCH}$) used for the half-duplex transmission and the second uplink transmission power ($P_{FD}$) used for the full-duplex transmission. Further, an example in which the first time resource unit is an $n^{th}$ time resource unit is used.

For a PUSCH, there is $P_{FD}(n)=P_{PUSCH}(n)-P_{offset}(n)$, and for a PUCCH, there is $P_{FD}(n)=P_{PUCCH}(n)-P_{offset}(n)$.

Herein, n is a time resource unit in which uplink transmission power needs to be modified. For example, n may be a subframe in which uplink transmission power needs to be modified.

In this embodiment of the present disclosure, the power offset obtained by the user equipment may be predefined or may be indicated in the scheduling grant information. Further, for the predefined power offset, if scheduling signaling that is used for both uplink scheduling and downlink scheduling is detected in a same time resource unit, use of the power offset is triggered to correct the first uplink transmission power.

In some embodiments of the present disclosure, an indication that is in the scheduling grant information in the first time resource unit and used for the power offset may be an offset value, or in the first time resource unit, use of a predefined offset value is triggered using 1 bit. In some embodiments of the present disclosure, alternatively, for the power offset, an offset value with a special meaning is used. The user equipment cancels scheduled uplink transmission using the power offset value with a special meaning.

In some embodiments of the present disclosure, power offset detection may be performed in some defined time resource unit sets. The power offset may be sent as an additional bit, or the power offset may be obtained by redefining some specific values in a common downlink grant. For a time resource unit outside the time resource unit set, a common downlink grant and a common uplink grant may be separately detected.

In some embodiments of the present disclosure, a scheduling grant and power control may be applied to a same time resource unit, for example, the current first time resource unit. Alternatively, a scheduling grant and power control may be respectively applied to two time resource units. For example, the scheduling grant is implemented in the first time resource unit, and the power control is implemented in the second time resource unit.

In some embodiments of the present disclosure, a power offset for adjusting PUSCH transmission power may implicitly match an MCS offset. Alternatively, when notifying a power offset by sending signaling, the base station notifies an MCS offset at the same time using explicit signaling. Further, specific use of the MCS offset is similar to that of the power offset. For example, for a PUSCH, $MCS_{FD}(n)=MCS_{PUSCH}(n)-MCS_{offset}(n)$.

The following uses an example in which the first time resource unit is an $n^{th}$ time resource unit. In this embodiment of the present disclosure, multiple methods may be used to enable user equipment to learn whether there is full-duplex transmission in the $n^{th}$ time resource unit. For example, an uplink grant is sent in an $(n-4)^{th}$ time resource unit, and then, a downlink grant is sent in the $n^{th}$ time resource unit. Based on a downlink scheduling moment and an uplink scheduling moment, the user equipment may know that there are both downlink scheduling and uplink scheduling in the $n^{th}$ time resource unit. For another example, both uplink scheduling and downlink scheduling in the $n^{th}$ time resource unit may be indicated in a single scheduling grant. The following provides description using an example in which uplink scheduling detection and downlink scheduling detection are not performed in a same time resource unit.

Figure 3A:
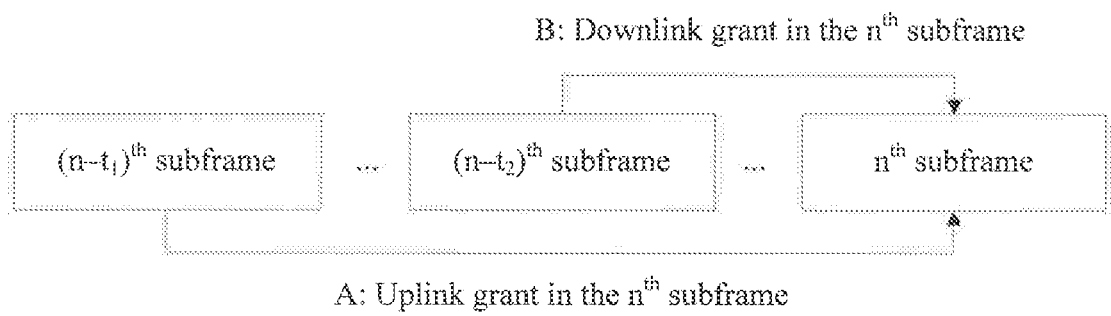
FIG. 3A is a schematic diagram of power control of a physical uplink shared channel (PUSCH) according to an embodiment of the present disclosure.

In an implementation of the present disclosure, a power offset is configured, and the user equipment may adjust second uplink transmission power based on whether there is the full-duplex transmission in the $n^{th}$ time resource unit. Whether there is the full-duplex transmission may be learned by means of scheduling grant detection. The following uses an example in which a time resource unit is a subframe. For example, as shown in FIG. 3A, a grant in an $(n-t_1)^{th}$ subframe is a scheduling grant A, and a grant in an $(n-t_2)^{th}$ subframe is a scheduling grant B. When both the scheduling grants A and B are detected, the user equipment obtains, from a power control command in the uplink grant A, first uplink transmission power used for half-duplex transmission, and corrects the first uplink transmission power using a predefined power offset to obtain the second uplink transmission power. In addition, for PUSCH transmission, a first MCS index is corrected based on an MCS offset. The MCS offset may be obtained using a mutual matching relationship between the MCS offset and the power offset, for example, $MCS_{offset}=f(P_{offset})$. Alternatively, the MCS offset may be notified to the user equipment using explicit signaling.

In another implementation of the present disclosure, the user equipment adjusts the first uplink transmission power based on a power offset detected in the downlink grant B. In FIG. 3A, there may be a 1-bit field in the downlink grant B. If the field is 1, the user equipment applies a fixed power offset. Alternatively, there are one or more bits in the downlink grant B that may be used to indicate a specific value of the power offset. Based on the power offset in the downlink grant B and the first uplink transmission power in the uplink grant A, the user equipment may obtain the second uplink transmission power used for the full-duplex transmission.

In some embodiments of the present disclosure, for the power offset transmitted in the downlink grant B, a power offset with a special value may be used to prevent transmission of a PUSCH that is simultaneously transmitted in a same subframe as a PDSCH.

In some embodiments of the present disclosure, that the power offset is indicated in the downlink grant B may lead to a piece of downlink control information (DCI) of a larger size. To reduce this load, the DCI of a larger size does not need to be detected in each subframe, and is detected only in a defined subframe set. In a subframe outside the subframe set, only uplink scheduling or downlink scheduling is detected.

Although in the example shown in FIG. 3A, a downlink grant in an $n^{th}$ subframe is sent $t_2$ ms earlier, $t_2$ may be set to 0 to avoid a delay. In this case, the user equipment may be configured to always send a short PUSCH, and the PUSCH is sent after a downlink grant in each subframe is detected.

Figure 3B:
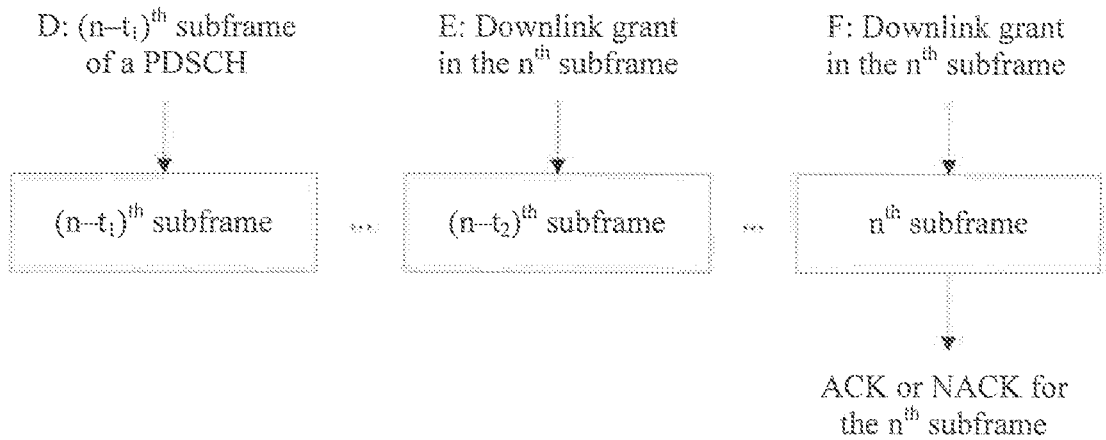
FIG. 3B is a schematic diagram of power control of another physical uplink control channel (PUCCH) according to an embodiment of the present disclosure.

As shown in FIG. 3B, the example in which a time resource unit is a subframe is still used. If the user equipment detects a PDSCH D in the $(n-t_1)^{th}$ subframe, the user equipment needs to feedback an ACK or a NACK in the $n^{th}$ subframe. Before feedback, the user equipment also endeavors to detect potential downlink scheduling in the same $n^{th}$ subframe. For example, if a downlink grant in the $n^{th}$ subframe is received, for example, a downlink grant E in the $(n-t_2)^{th}$ subframe or a downlink grant F in the $n^{th}$ subframe, it indicates that for the ACK/NACK, the ACK or NACK is sent at the same time when downlink receiving is performed. In this case, the user equipment adjusts transmission power for the ACK or NACK according to the predefined power offset, or performs adjustment based on a power offset in E or F for downlink scheduling. It should be noted that, if downlink pre-scheduling is not configured, and the user equipment needs to detect a downlink grant in a same subframe before uplink transmission, the ACK or NACK needs to be sent in a short format to allow the user equipment to have enough time to detect the downlink grant.

It should be noted that, whether power control is applied to the full-duplex transmission may be user equipment-specific configuration, or may be dynamically activated/deactivated by the PDCCH, for example, may be configured using RRC protocol signaling. 1 bit in the downlink grant is used to notify whether this rule is applied.

It can be learned from the foregoing illustration of the present disclosure that the method provided in this embodiment of the present disclosure can be applied to more precise power control of the full-duplex transmission.

It should be noted that, for brief description, the foregoing method embodiments are expressed as a series of action combinations. However, persons skilled in the art should appreciate that the present disclosure is not limited to the described action sequence, because according to the present disclosure, some steps may be performed in other sequences or performed simultaneously. In addition, persons skilled in the art should appreciate that all the embodiments described in the specification are preferred embodiments, and the related actions and modules are not necessarily mandatory to the present disclosure.

To better implement the foregoing solutions in the embodiments of the present disclosure, a related apparatus configured to implement the foregoing solutions is further provided in the following.

Figure 4:
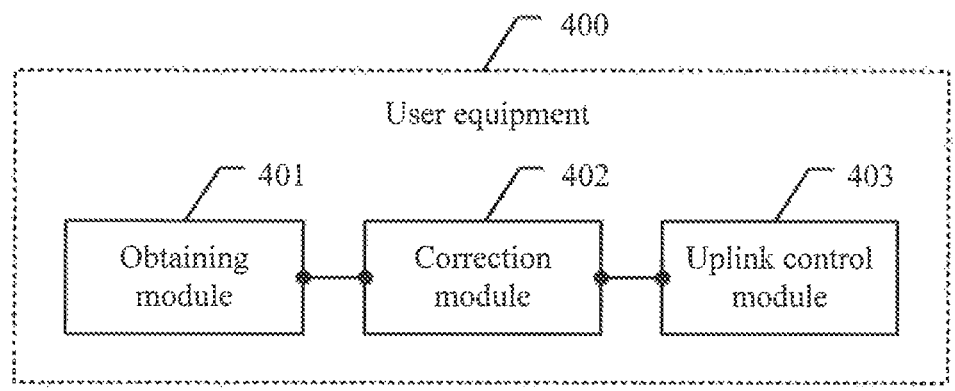
FIG. 4 is a schematic diagram of a compositional structure of user equipment according to an embodiment of the present disclosure.

As shown in FIG. 4, user equipment 400 provided in an embodiment of the present disclosure may include an obtaining module 401, a correction module 402, and an uplink control module 403.

The obtaining module 401 is configured to obtain a first time resource unit.

The correction module 402 is configured to correct, according to a power offset obtained by the user equipment 400, first uplink transmission power used for half-duplex transmission to obtain second uplink transmission power used for the full-duplex transmission when included scheduling grant information indicating full-duplex transmission is obtained from the first time resource unit.

The uplink control module 403 is configured to transmit an uplink signal in the first time resource unit or a second time resource unit according to the second uplink transmission power. The second time resource unit is a time resource unit that is after the first time resource unit.

In some embodiments of the present disclosure, the obtaining module 401 is further configured to detect, in a third time resource unit that is before the first time resource unit, whether there is uplink scheduling information indicating to perform transmission in the first time resource unit or the second time resource unit, and detect, in the first time resource unit or a fourth time resource unit that is before the first time resource unit, whether there is downlink scheduling information indicating to perform transmission in the first time resource unit or the second time resource unit, where the third time resource unit and the fourth time resource unit are two different time resource units, and determine that the first time resource unit includes the scheduling grant information indicating the full-duplex transmission if the uplink scheduling information is detected in the third time resource unit, a quantity of time resource units between the first time resource unit and the third time resource unit meets a preconfigured difference value, and the downlink scheduling information is detected in the first time resource unit or the fourth time resource unit, or determine that the first time resource unit does not include the scheduling grant information indicating the full-duplex transmission if the uplink scheduling information is not detected in the third time resource unit, a quantity of time resource units between the first time resource unit and the third time resource unit does not meet a preconfigured difference value, or the downlink scheduling information is not detected in the first time resource unit or the fourth time resource unit.

In some embodiments of the present disclosure, the obtaining module 401 is further configured to detect, in the first time resource unit, whether there is uplink feedback information corresponding to the downlink data information transmission in a fifth time resource unit that is before the first time resource unit, and detect, in the first time resource unit or a fourth time resource unit that is before the first time resource unit, whether there is downlink scheduling information indicating to perform transmission in the first time resource unit or the second time resource unit, where the fourth time resource unit and the fifth time resource unit are two different time resource units, and determine that the first time resource unit includes scheduling information indicating the full-duplex transmission if the uplink feedback information corresponding to the downlink data information transmission in the fifth time resource unit is detected in the first time resource unit, a quantity of time resource units between the first time resource unit and the fifth time resource unit meets a preconfigured difference value, and the downlink scheduling information is detected in the first time resource unit or the fourth time resource unit, or determine that the first time resource unit does not include information about the full-duplex transmission if the uplink feedback information is not detected in the first time resource unit, a quantity of time resource units between the first time resource unit and the fifth time resource unit does not meet a preconfigured difference value, or the downlink scheduling information is not detected in the first time resource unit or the fourth time resource unit.

In some embodiments of the present disclosure, the uplink scheduling information is uplink grant information, and the downlink scheduling information is downlink grant information.

In some embodiments of the present disclosure, the obtaining module 401 is further configured to, before the correction module 402 corrects, according to the power offset obtained by the user equipment 400, the first uplink transmission power used for the half-duplex transmission, obtain, from the uplink scheduling information in the third time resource unit, the first uplink transmission power used for the half-duplex transmission, or obtain, from the fifth time resource unit, the first uplink transmission power used for the half-duplex transmission, and obtain the power offset in a predefined manner, or obtain the power offset from the first time resource unit or the fourth time resource unit.

In some embodiments of the present disclosure, the uplink signal is uplink data information that the uplink scheduling information in the third time resource unit instructs to transmit in the first time resource unit or the second time resource unit. Alternatively, the uplink signal is the uplink feedback information that is in the first time resource unit and that is corresponding to downlink data information in the fifth time resource unit.

In some embodiments of the present disclosure, if the uplink scheduling information is detected in the third time resource unit, the quantity of time resource units between the first time resource unit and the third time resource unit meets the preconfigured difference value, and the downlink scheduling information is detected in the first time resource unit or the fourth time resource unit, the uplink control module 403 is further configured to cancel, according to the power offset included in the downlink scheduling information, uplink data information transmission that the uplink scheduling information in the third time resource unit instructs to perform in the first time resource unit or the second time resource unit after the obtaining module 401 detects, in the third time resource unit that is before the first time resource unit, whether there is the uplink scheduling information, if a power offset included in the downlink scheduling information is a preconfigured offset value with a special definition.

In some embodiments of the present disclosure, the obtaining module 401 is further configured to obtain the power offset in a predefined manner, detect the power offset from downlink scheduling information in the first time resource unit, or detect the power offset from scheduling grant information in each of multiple configured time resource units. The multiple configured time resource units are a subset of a set of all grant time resource units in which full-duplex transmission can be detected.

The correction module 402 is further configured to trigger the power offset to come into effect before correcting, according to the power offset obtained by the user equipment 400, the first uplink transmission power used for the half-duplex transmission, if the power offset is obtained by the user equipment 400 in the predefined manner, when corresponding trigger signaling is detected from the scheduling grant information in the first time resource unit or that in a time resource unit that is before the first time resource unit.

In some embodiments of the present disclosure, the obtaining module 401 is further configured to receive broadcast signaling or dedicated signaling sent by a base station, and obtain the power offset using the broadcast signaling or dedicated signaling.

In some embodiments of the present disclosure, the obtaining module 401 is further configured to detect the power offset from information newly added to the scheduling grant information, or detect the power offset from original information redefined in the scheduling grant information.

In some embodiments of the present disclosure, the obtaining module 401 is further configured to detect, in the first time resource unit, whether there are uplink scheduling information and downlink scheduling information, and determine that the first time resource unit includes the scheduling grant information indicating the full-duplex transmission if both the uplink scheduling information and the downlink scheduling information are detected in the first time resource unit, or determine that the first time resource unit does not include the scheduling grant information indicating the full-duplex transmission if at most one piece of scheduling information in the uplink scheduling information or the downlink scheduling information is detected in the first time resource unit.

In some embodiments of the present disclosure, the correction module 402 is further configured to calculate, in the following manner, the second uplink transmission power used for the full-duplex transmission:

$$P_{FD}=P_{HD}-P_{offset},$$

where $P_{FD}$ is the second uplink transmission power, $P_{HD}$ is the first uplink transmission power, and $P_{offset}$ is the power offset obtained by the user equipment 400.

In some embodiments of the present disclosure, the obtaining module 401 is further configured to obtain an MCS offset that matches the power offset after the correction module 402 corrects, according to the power offset obtained by the user equipment 400, the first uplink transmission power used for the half-duplex transmission.

The correction module 402 is further configured to correct, according to the MCS offset, a first MCS index used for the half-duplex transmission to obtain a second MCS index used for the full-duplex transmission.

In some embodiments of the present disclosure, the obtaining module 401 is further configured to receive the MCS offset using broadcast signaling or dedicated signaling, or obtain the MCS offset using a predefined mutual matching relationship between the power offset and the MCS offset.

In some embodiments of the present disclosure, the correction module 402 is further configured to calculate, in the following manner, the second MCS index used for the full-duplex transmission:

$$MCS_{FD}=MCS_{HD}-MCS_{offset},$$

where $MCS_{FD}$ is the second MCS index, $MCS_{HD}$ is the first MCS index, and $MCS_{offset}$ is the MCS offset.

In some embodiments of the present disclosure, the time resource unit includes a subframe, a frame, a timeslot, and an OFDM symbol.

It should be noted that content such as information exchange between the modules/units of the apparatus and the execution processes thereof is based on the same conception as the method embodiments of the present disclosure, and produces the same technical effects as the method embodiments of the present disclosure. For specific content, refer to the foregoing description in the method embodiments of the present disclosure. Details are not described herein again.

It can be learned from the description of the present disclosure in this embodiment that, first, the user equipment 400 obtains the first time resource unit. Next, if the user equipment 400 obtains, from the first time resource unit, the included scheduling grant information indicating the full-duplex transmission, the user equipment 400 corrects, according to the power offset obtained by the user equipment 400, the first uplink transmission power used for the half-duplex transmission to obtain the second uplink transmission power used for the full-duplex transmission. Finally, the user equipment 400 transmits the uplink signal in the first time resource unit or the second time resource unit according to the second uplink transmission power. The second time resource unit is a time resource unit that is after the first time resource unit. The user equipment 400 in this embodiment of the present disclosure may determine the second uplink transmission power using the preconfigured power offset. Therefore, uplink channel power control can be correctly set according to the second uplink transmission power obtained by correcting the first uplink transmission power when the user equipment 400 determines to perform the full-duplex transmission. In this way, precise power control can be implemented, and self-interference can be accordingly avoided such that downlink data can be normally detected, and a system gain of full-duplex transmission in a wireless communications system is improved. The method provided in the present disclosure may be applied to an LTE system and a WI-FI system.

Figure 5A:
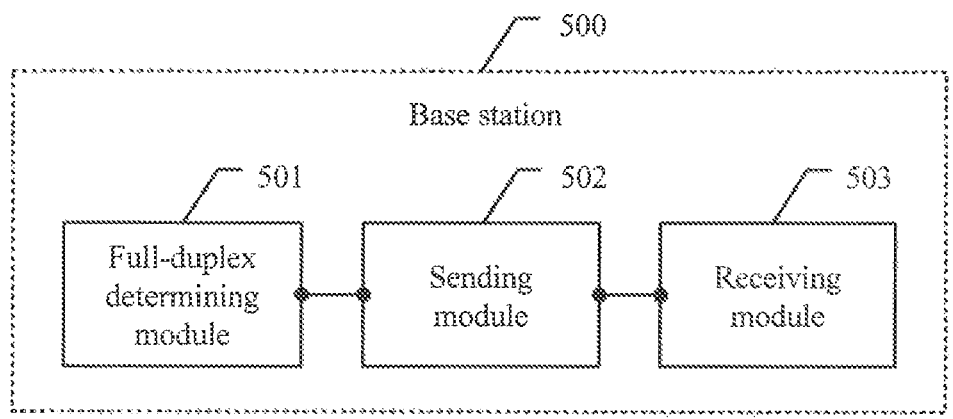
FIG. 5A is a schematic diagram of a compositional structure of a base station according to an embodiment of the present disclosure.

As shown in FIG. 5A, a base station 500 provided in an embodiment of the present disclosure may include a full-duplex determining module 501, a sending module 502, and a receiving module 503.

The full-duplex determining module 501 is configured to determine whether user equipment is instructed in a first time resource unit to perform full-duplex transmission, and obtain a result of the determining.

The sending module 502 is configured to send, to the user equipment in the first time resource unit, included scheduling grant information indicating the user equipment to perform the full-duplex transmission when the result of the determining is that the user equipment can be instructed in the first time resource unit to perform the full-duplex transmission.

The receiving module 503 is configured to receive an uplink signal transmitted by the user equipment in the first time resource unit or a second time resource unit. The second time resource unit is a time resource unit that is after the first time resource unit.

In some embodiments of the present disclosure, the full-duplex determining module 501 is further configured to determine that the user equipment can be instructed in the first time resource unit to perform the full-duplex transmission if the base station 500 transmits, in a third time resource unit that is before the first time resource unit, uplink scheduling information indicating to perform transmission in the first time resource unit or the second time resource unit, and the base station 500 transmits, in the first time resource unit or a fourth time resource unit that is before the first time resource unit, downlink scheduling information indicating to perform transmission in the first time resource unit or the second time resource unit, where the third time resource unit and the fourth time resource unit are two different time resource units, or determine that the user equipment cannot be instructed in the first time resource unit to perform the full-duplex transmission if the base station 500 does not transmit the uplink scheduling information in the third time resource unit, the base station 500 determines that a quantity of time resource units between the first time resource unit and the third time resource unit does not meet a preconfigured difference value, or the base station 500 does not detect the downlink scheduling information in the first time resource unit or the fourth time resource unit.

In some embodiments of the present disclosure, the full-duplex determining module 501 is further configured to determine that the user equipment can be instructed in the first time resource unit to perform the full-duplex transmission if the base station 500 transmits, in the first time resource unit, uplink feedback information corresponding to the downlink data information transmission in a fifth time resource unit that is before the first time resource unit, and the base station 500 transmits, in the first time resource unit or a fourth time resource unit that is before the first time resource unit, downlink scheduling information indicating to perform transmission in the first time resource unit or the second time resource unit, where the fourth time resource unit and the fifth time resource unit are two different time resource units, or determine that the user equipment can be instructed in the first time resource unit to perform the full-duplex transmission if the base station 500 does not transmit the uplink feedback information in the first time resource unit, the base station 500 determines that a quantity of time resource units between the first time resource unit and the fifth time resource unit does not meet a preconfigured difference value, or the base station 500 does not detect the downlink scheduling information in the first time resource unit or the fourth time resource unit.

In some embodiments of the present disclosure, the downlink scheduling information includes a preconfigured offset value with a special definition, and the user equipment cancels, according to a power offset included in the downlink scheduling information, uplink data information transmission that the uplink scheduling information in the third time resource unit instructs to perform in the first time resource unit or the second time resource unit.

In some embodiments of the present disclosure, the sending module 502 is further configured to send broadcast signaling or dedicated signaling to the user equipment before the full-duplex determining module 501 determines whether the user equipment is instructed in the first time resource unit to perform the full-duplex transmission. The broadcast signaling or dedicated signaling includes a power offset configured by the base station 500.

Figure 5B:
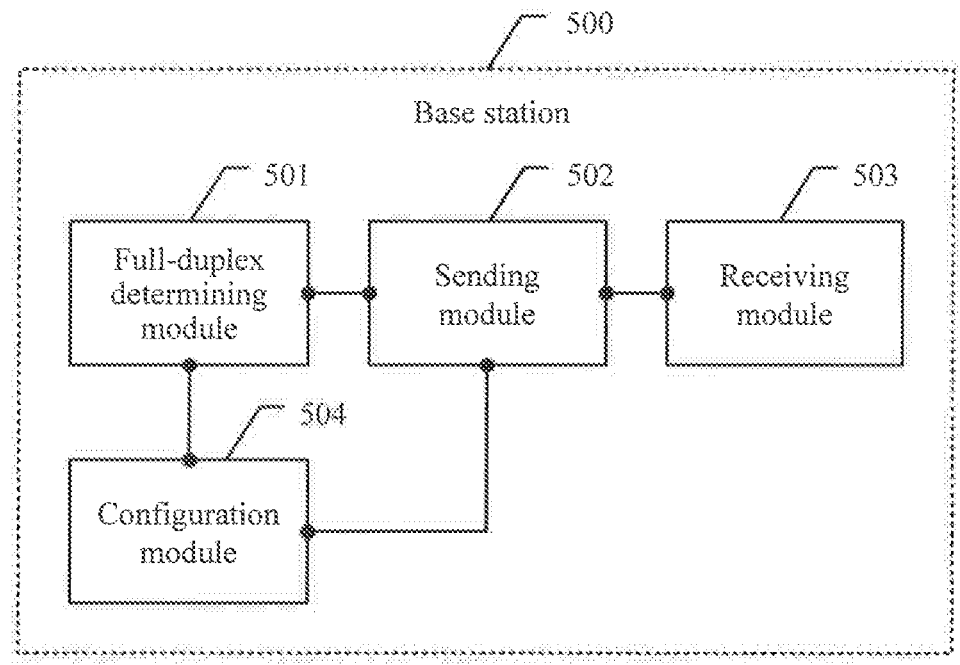
FIG. 5B is a schematic diagram of a compositional structure of another base station according to an embodiment of the present disclosure.

In some embodiments of the present disclosure, as shown in FIG. 5B, the base station 500 further includes a configuration module 504 configured to, before the full-duplex determining module 501 determines whether the user equipment is instructed in the first time resource unit to perform the full-duplex transmission, newly add information to the scheduling grant information in the first time resource unit to carry the power offset and/or an MCS offset, add, by the base station 500, a power offset and/or an MCS offset to original information redefined in the scheduling grant information in the first time resource unit, newly add, by the base station 500, information to scheduling grant information in each of multiple configured time resource units to carry the power offset and/or an MCS offset, or add, by the base station 500, a power offset and/or an MCS offset to original information redefined in scheduling grant information in each of multiple configured time resource units.

In some embodiments of the present disclosure, the time resource unit includes a subframe, a frame, a timeslot, and an OFDM symbol.

It can be learned from the description of the present disclosure in this embodiment that, the base station 500 determines whether the user equipment can be instructed in the first time resource unit to perform the full-duplex transmission, and obtains the result of the determining. If the result of the determining is that the user equipment can be instructed in the first time resource unit to perform the full-duplex transmission, the base station 500 sends, to the user equipment in the first time resource unit, the included scheduling grant information indicating the user equipment to perform the full-duplex transmission. The base station 500 receives the uplink signal that is transmitted after the user equipment obtains the scheduling grant information indicating the full-duplex transmission and in the first time resource unit or the second time resource unit according to the second uplink transmission power obtained by correcting the first uplink transmission power used for the half-duplex transmission. The second time resource unit is a time resource unit that is after the first time resource unit in terms of time. The user equipment in this embodiment of the present disclosure may determine the second uplink transmission power using the preconfigured power offset. Therefore, uplink channel power control can be correctly set according to the second uplink transmission power obtained by correcting the first uplink transmission power when the user equipment determines to perform the full-duplex transmission. In this way, precise power control can be implemented, and self-interference can be accordingly avoided such that downlink data can be normally detected, and a system gain of full-duplex transmission in a wireless communications system is improved. The method provided in the present disclosure may be applied to an LTE system and a WI-FI system.

An embodiment of the present disclosure further provides a computer storage medium. The computer storage medium stores a program. The program executes some or all steps recorded in the foregoing method embodiments.

Figure 6:
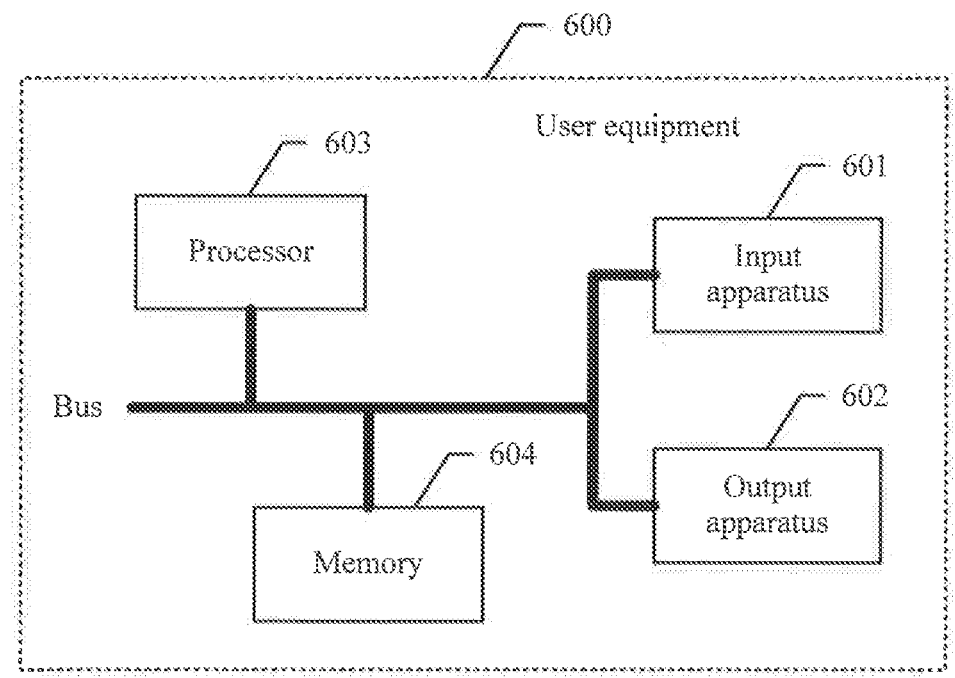
FIG. 6 is a schematic diagram of a compositional structure of another user equipment according to an embodiment of the present disclosure.

The following describes another user equipment provided in an embodiment of the present disclosure. As shown in FIG. 6, user equipment 600 includes an input apparatus 601, an output apparatus 602, a processor 603, and a memory 604 (there may be one or more processors 603 in the user equipment 600, and one processor 603 is used as an example in FIG. 6). In some embodiments of the present disclosure, the input apparatus 601, the output apparatus 602, the processor 603, and the memory 604 may be connected to each other using a bus or in another manner, for example, connected to each other using a bus in FIG. 6.

The processor 603 is configured to perform the method performed by the user equipment side in the foregoing embodiment. Further, the processor 603 is configured to perform the following steps of obtaining a first time resource unit, correcting, according to a power offset obtained by the user equipment 600, first uplink transmission power used for half-duplex transmission to obtain second uplink transmission power used for the full-duplex transmission if the user equipment 600 obtains, from the first time resource unit, included scheduling grant information indicating full-duplex transmission, and transmitting an uplink signal in the first time resource unit or a second time resource unit according to the second uplink transmission power, where the second time resource unit is a time resource unit that is after the first time resource unit in terms of time.

In some embodiments of the present disclosure, the processor 603 is further configured to perform the following steps of detecting, in a third time resource unit that is before the first time resource unit, whether there is uplink scheduling information indicating to perform transmission in the first time resource unit or the second time resource unit, and detecting, in the first time resource unit or a fourth time resource unit that is before the first time resource unit, whether there is downlink scheduling information indicating to perform transmission in the first time resource unit or the second time resource unit, where the third time resource unit and the fourth time resource unit are two different time resource units, and determining that the first time resource unit includes the scheduling grant information indicating the full-duplex transmission if the uplink scheduling information is detected in the third time resource unit, a quantity of time resource units between the first time resource unit and the third time resource unit meets a preconfigured difference value, and the downlink scheduling information is detected in the first time resource unit or the fourth time resource unit, or determining that the first time resource unit does not include the scheduling grant information indicating the full-duplex transmission if the uplink scheduling information is not detected in the third time resource unit, a quantity of time resource units between the first time resource unit and the third time resource unit does not meet a preconfigured difference value, or the downlink scheduling information is not detected in the first time resource unit or the fourth time resource unit.

In some embodiments of the present disclosure, the processor 603 is further configured to perform the following steps of detecting, in the first time resource unit, whether there is uplink feedback information corresponding to the downlink data information transmission in a fifth time resource unit that is before the first time resource unit, and detecting, in the first time resource unit or a fourth time resource unit that is before the first time resource unit, whether there is downlink scheduling information indicating to perform transmission in the first time resource unit or the second time resource unit, where the fourth time resource unit and the fifth time resource unit are two different time resource units, and determining that the first time resource unit includes scheduling information indicating the full-duplex transmission if the uplink feedback information corresponding to the downlink data information transmission in the fifth time resource unit is detected in the first time resource unit, a quantity of time resource units between the first time resource unit and the fifth time resource unit meets a preconfigured difference value, and the downlink scheduling information is detected in the first time resource unit or the fourth time resource unit, or determining that the first time resource unit does not include information about the full-duplex transmission if the uplink feedback information is not detected in the first time resource unit, a quantity of time resource units between the first time resource unit and the fifth time resource unit does not meet a preconfigured difference value, or the downlink scheduling information is not detected in the first time resource unit or the fourth time resource unit.

In some embodiments of the present disclosure, the uplink scheduling information stored in the memory 604 is uplink grant information, and the downlink scheduling information is downlink grant information.

In some embodiments of the present disclosure, before correcting, according to a power offset obtained by the user equipment 600, first uplink transmission power used for half-duplex transmission, the processor 603 is further configured to perform the following steps of obtaining, from the uplink scheduling information in the third time resource unit, the first uplink transmission power used for the half-duplex transmission, or obtaining, from the fifth time resource unit, the first uplink transmission power used for the half-duplex transmission, and obtaining the power offset in a predefined manner, or obtaining the power offset from the first time resource unit or the fourth time resource unit.

In some embodiments of the present disclosure, the uplink signal stored in the memory 604 is uplink data information that the uplink scheduling information in the third time resource unit instructs to transmit in the first time resource unit or the second time resource unit. Alternatively, the uplink signal is the uplink feedback information that is in the first time resource unit and that is corresponding to downlink data information in the fifth time resource unit.

In some embodiments of the present disclosure, the processor 603 is further configured to perform the following step of canceling, according to the power offset included in the downlink scheduling information, uplink data information transmission that the uplink scheduling information in the third time resource unit instructs to perform in the first time resource unit or the second time resource unit if the uplink scheduling information is detected in the third time resource unit, the quantity of time resource units between the first time resource unit and the third time resource unit meets the preconfigured difference value, and the downlink scheduling information is detected in the first time resource unit or the fourth time resource unit, after detecting, in a third time resource unit that is before the first time resource unit, whether there is uplink scheduling information indicating to perform transmission in the first time resource unit or the second time resource unit, if a power offset included in the downlink scheduling information is a preconfigured offset value with a special definition.

In some embodiments of the present disclosure, the power offset stored in the memory 604 is obtained by the user equipment 600 in a predefined manner, the power offset is detected by the user equipment 600 from downlink scheduling information in the first time resource unit, or the power offset is detected by the user equipment 600 from scheduling grant information in each of multiple configured time resource units. The multiple configured time resource units are a subset of a set of all grant time resource units in which full-duplex transmission can be detected.

In some embodiments of the present disclosure, before correcting, according to a power offset obtained by the user equipment 600, first uplink transmission power used for half-duplex transmission, if the power offset is obtained by the user equipment 600 in the predefined manner, when detecting corresponding trigger signaling from the scheduling grant information in the first time resource unit or that in a time resource unit that is before the first time resource unit, the processor 603 is further configured to perform the following step of triggering the power offset to come into effect.

In some embodiments of the present disclosure, the processor 603 is further configured to perform the following steps of receiving broadcast signaling or dedicated signaling sent by a base station, and obtaining the power offset using the broadcast signaling or dedicated signaling.

The processor 603 is further configured to perform the following step of detecting the power offset from information newly added to the scheduling grant information, or detecting the power offset from original information redefined in the scheduling grant information.

In some embodiments of the present disclosure, the processor 603 is further configured to perform the following steps of detecting, in the first time resource unit, whether there are uplink scheduling information and downlink scheduling information, and determining that the first time resource unit includes the scheduling grant information indicating the full-duplex transmission if both the uplink scheduling information and the downlink scheduling information are detected in the first time resource unit, or determining that the first time resource unit does not include the scheduling grant information indicating the full-duplex transmission if at most one piece of scheduling information in the uplink scheduling information or the downlink scheduling information is detected in the first time resource unit.

In some embodiments of the present disclosure, the processor 603 is further configured to perform the following step of calculating, in the following manner, the second uplink transmission power used for the full-duplex transmission:

$$P_{FD}=P_{HD}-P_{offset},$$

where $P_{FD}$ is the second uplink transmission power, $P_{HD}$ is the first uplink transmission power, and $P_{offset}$ is the power offset obtained by the user equipment 600.

In some embodiments of the present disclosure, after correcting, according to a power offset obtained by the user equipment 600, first uplink transmission power used for half-duplex transmission, the processor 603 is further configured to perform the following steps obtaining an MCS offset that matches the power offset, and correcting, according to the MCS offset, a first MCS used for the half-duplex transmission to obtain a second MCS used for the full-duplex transmission.

In some embodiments of the present disclosure, the processor 603 is further configured to perform the following step of receiving the MCS offset using broadcast signaling or dedicated signaling, or obtaining the MCS offset using a predefined mutual matching relationship between the power offset and the MCS offset.

In some embodiments of the present disclosure, the processor 603 is further configured to perform the following step of calculating, in the following manner, the second MCS index used for the full-duplex transmission:

$$MCS_{FD}=MCS_{HD}-MCS_{offset},$$

where $MCS_{FD}$ is the second MCS index, $MCS_{HD}$ is the first MCS index, and $MCS_{offset}$ is the MCS offset.

In some embodiments of the present disclosure, the time resource unit stored in the memory 60 includes a subframe, a frame, a timeslot, and an OFDM symbol.

It can be learned from the description of the present disclosure in this embodiment that, first, the user equipment 600 obtains the first time resource unit. Next, if the user equipment 600 obtains, from the first time resource unit, the included scheduling grant information indicating the full-duplex transmission, the user equipment 600 corrects, according to the power offset obtained by the user equipment 600, the first uplink transmission power used for the half-duplex transmission to obtain the second uplink transmission power used for the full-duplex transmission. Finally, the user equipment 600 transmits the uplink signal in the first time resource unit or the second time resource unit according to the second uplink transmission power. The second time resource unit is a time resource unit that is after the first time resource unit. The user equipment 600 in this embodiment of the present disclosure may determine the second uplink transmission power using the preconfigured power offset. Therefore, uplink channel power control can be correctly set according to the second uplink transmission power obtained by correcting the first uplink transmission power when the user equipment 600 determines to perform the full-duplex transmission. In this way, precise power control can be implemented, and self-interference can be accordingly avoided such that downlink data can be normally detected, and a system gain of full-duplex transmission in a wireless communications system is improved. The method provided in the present disclosure may be applied to an LTE system and a WI-FI system.

Figure 7:
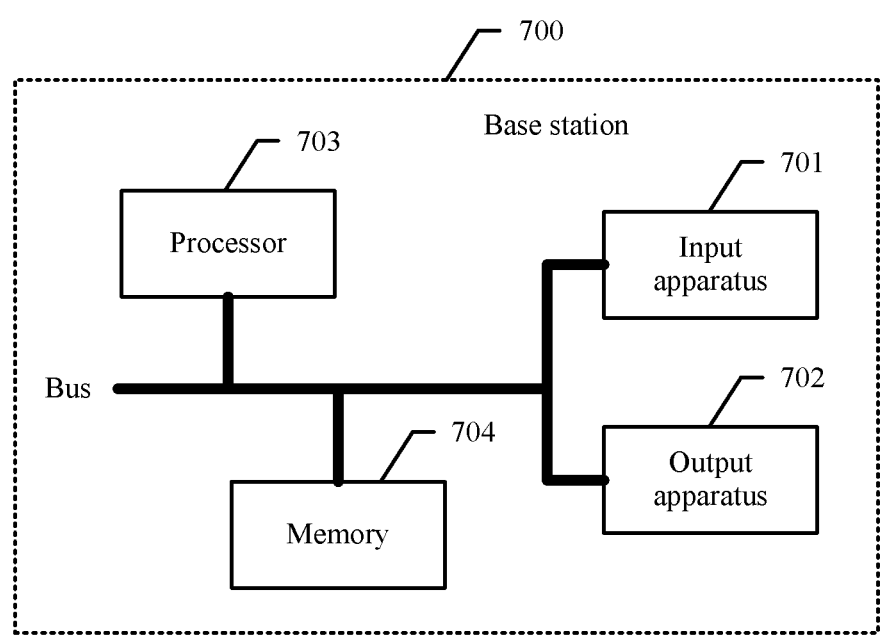
FIG. 7 is a schematic diagram of a compositional structure of another base station according to an embodiment of the present disclosure.

The following describes another base station provided in an embodiment of the present disclosure. As shown in FIG. 7, a base station 700 includes an input apparatus 701, an output apparatus 702, a processor 703, and a memory 704 (there may be one or more processors 703 in the base station 700, and one processor 703 is used as an example in FIG. 7). In some embodiments of the present disclosure, the input apparatus 701, the output apparatus 702, the processor 703, and the memory 704 may be connected to each other using a bus or in another manner, for example, connected to each other using a bus in FIG. 7.

The processor 703 is configured to perform the method performed by the base station side in the foregoing embodiment. Further, the processor 703 is configured to perform the following steps of determining whether user equipment can be instructed in a first time resource unit to perform full-duplex transmission, obtaining a result of the determining, sending, to the user equipment in the first time resource unit, included scheduling grant information indicating the user equipment to perform the full-duplex transmission if the result of the determining is that the user equipment can be instructed in the first time resource unit to perform the full-duplex transmission, and receiving an uplink signal that is transmitted after the user equipment obtains the scheduling grant information indicating the full-duplex transmission and in the first time resource unit or a second time resource unit according to second uplink transmission power obtained by correcting first uplink transmission power used for half-duplex transmission, where the second time resource unit is a time resource unit that is after the first time resource unit in terms of time.

In some embodiments of the present disclosure, the processor 703 is specifically configured to perform the following step of determining that the user equipment can be instructed in the first time resource unit to perform the full-duplex transmission if the base station 700 transmits, in a third time resource unit that is before the first time resource unit, uplink scheduling information indicating to perform transmission in the first time resource unit or the second time resource unit, and the base station 700 transmits, in the first time resource unit or a fourth time resource unit that is before the first time resource unit, downlink scheduling information indicating to perform transmission in the first time resource unit or the second time resource unit, where the third time resource unit and the fourth time resource unit are two different time resource units, or determining that the user equipment cannot be instructed in the first time resource unit to perform the full-duplex transmission if the base station 700 does not transmit the uplink scheduling information in the third time resource unit, the base station 700 determines that a quantity of time resource units between the first time resource unit and the third time resource unit does not meet a preconfigured difference value, or the base station 700 does not detect the downlink scheduling information in the first time resource unit or the fourth time resource unit.

In some embodiments of the present disclosure, the processor 703 is further configured to perform the following step if the base station 700 transmits, in the first time resource unit, uplink feedback information corresponding to the downlink data information transmission in a fifth time resource unit that is before the first time resource unit, and the base station 700 transmits, in the first time resource unit or a fourth time resource unit that is before the first time resource unit, downlink scheduling information indicating to perform transmission in the first time resource unit or the second time resource unit, determining that the user equipment can be instructed in the first time resource unit to perform the full-duplex transmission, where the fourth time resource unit and the fifth time resource unit are two different time resource units, or if the base station 700 does not transmit the uplink feedback information in the first time resource unit, the base station 700 determines that a quantity of time resource units between the first time resource unit and the fifth time resource unit does not meet a preconfigured difference value, or the base station 700 does not detect the downlink scheduling information in the first time resource unit or the fourth time resource unit, determining that the user equipment can be instructed in the first time resource unit to perform the full-duplex transmission.

In some embodiments of the present disclosure, the downlink scheduling information stored in the memory 704 includes a preconfigured offset value with a special definition, and the user equipment cancels, according to a power offset included in the downlink scheduling information, uplink data information transmission that the uplink scheduling information in the third time resource unit instructs to perform in the first time resource unit or the second time resource unit.

In some embodiments of the present disclosure, before determining whether user equipment can be instructed in a first time resource unit to perform full-duplex transmission, the processor 703 is further configured to perform the following step of sending broadcast signaling or dedicated signaling to the user equipment, where the broadcast signaling or dedicated signaling includes a power offset and/or an MCS offset that are/is configured by the base station 700.

In some embodiments of the present disclosure, before determining whether user equipment can be instructed in a first time resource unit to perform full-duplex transmission, the processor 703 is further configured to perform the following step of newly adding information to the scheduling grant information in the first time resource unit to carry the power offset and/or an MCS offset, adding a power offset and/or an MCS offset to original information redefined in the scheduling grant information in the first time resource unit, newly adding information to scheduling grant information in each of multiple configured time resource units to carry the power offset and/or an MCS offset, or adding a power offset and/or an MCS offset to original information redefined in scheduling grant information in each of multiple configured time resource units.

In some embodiments of the present disclosure, the time resource unit stored in the memory 704 includes a subframe, a frame, a timeslot, and an OFDM symbol.

It can be learned from the description of the present disclosure in this embodiment that, the base station 700 determines whether the user equipment can be instructed in the first time resource unit to perform the full-duplex transmission, and obtains the result of the determining. If the result of the determining is that the user equipment can be instructed in the first time resource unit to perform the full-duplex transmission, the base station 700 sends, to the user equipment in the first time resource unit, the included scheduling grant information indicating the user equipment to perform the full-duplex transmission. The base station 700 receives the uplink signal that is transmitted after the user equipment obtains the scheduling grant information indicating the full-duplex transmission and in the first time resource unit or the second time resource unit according to the second uplink transmission power obtained by correcting the first uplink transmission power used for the half-duplex transmission. The second time resource unit is a time resource unit that is after the first time resource unit in terms of time. The user equipment in this embodiment of the present disclosure may determine the second uplink transmission power using the preconfigured power offset. Therefore, uplink channel power control can be correctly set according to the second uplink transmission power obtained by correcting the first uplink transmission power when the user equipment determines to perform the full-duplex transmission. In this way, precise power control can be implemented, and self-interference can be accordingly avoided such that downlink data can be normally detected, and a system gain of full-duplex transmission in a wireless communications system is improved. The method provided in the present disclosure may be applied to an LTE system and a WI-FI system.

In addition, it should be noted that the described apparatus embodiment is merely an example. The units described as separate parts may or may not be physically separate, and parts displayed as units may or may not be physical units, may be located in one position, or may be distributed on a plurality of network units. Some or all the modules may be selected according to actual needs to achieve the objectives of the solutions of the embodiments. In addition, in the accompanying drawings of the apparatus embodiments provided by the present disclosure, connection relationships between modules indicate that the modules have communication connections with each other, which may be further implemented as one or more communications buses or signal cables. Persons of ordinary skill in the art may understand and implement the embodiments of the present disclosure without creative efforts.

Based on the description of the foregoing implementations, persons skilled in the art may clearly understand that the present disclosure may be implemented by software in addition to necessary universal hardware, or by dedicated hardware, including a dedicated integrated circuit, a dedicated central processing unit (CPU), a dedicated memory, a dedicated component, and the like. Generally, any functions that can be performed by a computer program can be easily implemented using corresponding hardware. Moreover, a specific hardware structure used to achieve a same function may be of various forms, for example, in a form of an analog circuit, a digital circuit, a dedicated circuit, or the like. However, as for the present disclosure, software program implementation is a better implementation in most cases. Based on such an understanding, the technical solutions of the present disclosure essentially or the part contributing to the other approaches may be implemented in a form of a software product. The software product is stored in a readable storage medium, such as a floppy disk, a universal serial bus (USB) flash drive, a removable hard disk, a read-only memory (ROM), a random access memory (RAM), a magnetic disk, or an optical disc of a computer, and includes several instructions for indicating a computer device (which may be a personal computer, a server, a network device, or the like) to perform the methods described in the embodiments of the present disclosure.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A transmission power control method, comprising:
    obtaining, by user equipment, a first time resource block when the user equipment communicates in half-duplex transmission, wherein the first time resource block comprises a power offset, and wherein the power offset indicates an amount by which the user equipment needs to adjust a first uplink transmission power when switching from the half-duplex transmission to full-duplex transmission;
    correcting, by the user equipment according to the power offset obtained by the user equipment, the first uplink transmission power used for the half-duplex transmission to obtain a second uplink transmission power used for the full-duplex transmission when the user equipment obtains, from the first time resource block, scheduling grant information indicating the full-duplex transmission;
    transmitting, by the user equipment, an uplink signal in a second time resource block according to the second uplink transmission power, wherein the second time resource block is a time resource block that is after the first time resource block in terms of time;
    obtaining, by the user equipment, a modulation and coding scheme (MCS) offset using a predefined mutual matching relationship between the power offset and the MCS offset, wherein the predefined mutual matching relationship is specified at least in part by an additional bit;
    detecting, by the user equipment in the first time resource block, whether there is uplink feedback information corresponding to downlink data information transmission in a fifth time resource block that is before the first time resource block; and
    correcting, by the user equipment according to the MCS offset, a first MCS index used for the half-duplex transmission to obtain a second MCS index used for the full-duplex transmission.

2. The transmission power control method of claim 1, wherein obtaining the first time resource block comprises:
    detecting, by the user equipment in a third time resource block that is before the first time resource block, whether there is uplink scheduling information indicating to perform transmission in the second time resource block;
    detecting, by the user equipment in the first time resource block or a fourth time resource block that is before the first time resource block, whether there is downlink scheduling information indicating to perform the transmission in the second time resource block, wherein the third time resource block and the fourth time resource block are two different time resource blocks;
    determining, by the user equipment, that the first time resource block comprises the scheduling grant information indicating the full-duplex transmission when the uplink scheduling information is detected in the third time resource block, wherein a quantity of time resource blocks between the first time resource block and the third time resource block meets a preconfigured difference value, and wherein the downlink scheduling information is detected in the first time resource block or the fourth time resource block; and determining, by the user equipment, that the first time resource block does not comprise the scheduling grant information indicating the full-duplex transmission when the uplink scheduling information is not detected in the third time resource block, wherein either the quantity of time resource blocks between the first time resource block and the third time resource block does not meet the preconfigured difference value.

3. The transmission power control method of claim 2, wherein before correcting the first uplink transmission power used for the half-duplex transmission, the transmission power control method further comprises:

obtaining, by the user equipment from the uplink scheduling information in the third time resource block, the first uplink transmission power used for the half-duplex transmission, or obtaining, by the user equipment from a fifth time resource block that is before the first time resource block, the first uplink transmission power used for the half-duplex transmission; and obtaining, by the user equipment, the power offset in a predefined manner, or obtaining the power offset from the first time resource block or the fourth time resource block.

4. The transmission power control method of claim 2, wherein the uplink signal comprises uplink data information that the uplink scheduling information in the third time resource block instructs to transmit in the second time resource block.

5. The transmission power control method of claim 2, wherein when the uplink scheduling information is detected in the third time resource block, wherein the quantity of time resource blocks meets the preconfigured difference value, wherein the downlink scheduling information is detected in the first time resource block or the fourth time resource block, and wherein after detecting whether there is the uplink scheduling information, the transmission power control method further comprises cancelling, by the user equipment according to the power offset that is part of the downlink scheduling information, uplink data information transmission that the uplink scheduling information in the third time resource block instructs to perform in the second time resource block when the power offset that is part of the downlink scheduling information comprises a preconfigured offset value with a special definition.

6. The transmission power control method of claim 2, wherein the uplink signal comprises uplink feedback information in the first time resource block corresponding to downlink data information in a fifth time resource block that is before the first time resource block.

7. The transmission power control method of claim 1, wherein obtaining the first time resource block comprises:

detecting, by the user equipment in the first time resource block or a fourth time resource block that is before the first time resource block, whether there is downlink scheduling information indicating to perform transmission in the second time resource block, wherein the fourth time resource block and the fifth time resource block are two different time resource blocks;

determining, by the user equipment, that the first time resource block comprises the scheduling grant information indicating the full-duplex transmission when the uplink feedback information corresponding to the downlink data information transmission in the fifth time resource block is detected in the first time resource block, wherein a quantity of time resource blocks between the first time resource block and the fifth time resource block meets a preconfigured difference value, and wherein the downlink scheduling information is detected in the first time resource block or the fourth time resource block; and determining, by the user equipment, that the first time resource block does not comprise the scheduling grant information indicating the full-duplex transmission when the uplink feedback information is not detected in the first time resource block, wherein the quantity of time resource blocks between the first time resource block and the fifth time resource block does not meet the preconfigured difference value.

8. The transmission power control method of claim 1, wherein obtaining the first time resource block comprises:

detecting, by the user equipment in the first time resource block, whether there are uplink scheduling information and downlink scheduling information;

determining, by the user equipment, that the first time resource block comprises the scheduling grant information indicating the full-duplex transmission when both the uplink scheduling information and the downlink scheduling information are detected in the first time resource block; and determining that the first time resource block does not comprise the scheduling grant information indicating the full-duplex transmission when at most one piece of scheduling information in the uplink scheduling information is detected in the first time resource block.

9. The transmission power control method of claim 1, wherein obtaining the first time resource block comprises:

detecting, by the user equipment in a third time resource block that is before the first time resource block, whether there is uplink scheduling information indicating to perform transmission in the second time resource block;

detecting, by the user equipment in the first time resource block or a fourth time resource block that is before the first time resource block, whether there is downlink scheduling information indicating to perform the transmission in the second time resource block, wherein the third time resource block and the fourth time resource block are two different time resource blocks;

determining, by the user equipment, that the first time resource block comprises the scheduling grant information indicating the full-duplex transmission when the uplink scheduling information is detected in the third time resource block, wherein a quantity of time resource blocks between the first time resource block and the third time resource block meets a preconfigured difference value, and wherein the downlink scheduling information is detected in the first time resource block or the fourth time resource block; and determining, by the user equipment, that the first time resource block does not comprise the scheduling grant information indicating the full-duplex transmission when the uplink scheduling information is not detected in the third time resource block, wherein the downlink scheduling information is not detected in the first time resource block or the fourth time resource block.

10. The transmission power control method of claim 1, wherein obtaining the first time resource block comprises:

detecting, by the user equipment in the first time resource block, whether there is uplink feedback information corresponding to downlink data information transmission in a fifth time resource block that is before the first time resource block;

detecting, by the user equipment in the first time resource block or a fourth time resource block that is before the first time resource block, whether there is downlink scheduling information indicating to perform transmission in the second time resource block, wherein the fourth time resource block and the fifth time resource block are two different time resource blocks;

determining, by the user equipment, that the first time resource block comprises the scheduling grant information indicating the full-duplex transmission when the uplink feedback information corresponding to the downlink data information transmission in the fifth time resource block is detected in the first time resource block, wherein a quantity of time resource blocks between the first time resource block and the fifth time resource block meets a preconfigured difference value, and wherein the downlink scheduling information is detected in the first time resource block or the fourth time resource block; and determining, by the user equipment, that the first time resource block does not comprise the scheduling grant information indicating the full-duplex transmission when the uplink feedback information is not detected in the first time resource block, wherein the downlink scheduling information is not detected in the first time resource block or the fourth time resource block.

11. The transmission power control method of claim 1, wherein obtaining the first time resource block comprises:

detecting, by the user equipment in the first time resource block, whether there are uplink scheduling information and downlink scheduling information;

determining, by the user equipment, that the first time resource block comprises the scheduling grant information indicating the full-duplex transmission when both the uplink scheduling information and the downlink scheduling information are detected in the first time resource block; and determining that the first time resource block does not comprise the scheduling grant information indicating the full-duplex transmission when at most one piece of scheduling information in the downlink scheduling information is detected in the first time resource block.

12. User equipment, comprising:

a memory comprising instructions; and a processor coupled to the memory, wherein the instructions cause the processor to be configured to:

obtain a first time resource block when the user equipment communicates in half-duplex transmission, wherein the first time resource block comprises a power offset, and wherein the power offset indicates an amount by which the user equipment needs to adjust a first uplink transmission power when switching from the half-duplex transmission to full-duplex transmission;

correct, according to the power offset obtained by the user equipment, the first uplink transmission power used for the half-duplex transmission to obtain a second uplink transmission power used for the full-duplex transmission when scheduling grant information indicating the full-duplex transmission is obtained from the first time resource block;

transmit an uplink signal in a second time resource block according to the second uplink transmission power, wherein the second time resource block is a time resource block that is after the first time resource block in terms of time;

obtain a modulation and coding scheme (MCS) offset using a predefined mutual matching relationship between the power offset and the MCS offset, wherein the predefined mutual matching relationship is specified at least in part by an additional bit;

detect, in the first time resource block, whether there is uplink feedback information corresponding to downlink data information transmission in a fifth time resource block that is before the first time resource block; and correct, according to the MCS offset, a first MCS index used for the half-duplex transmission to obtain a second MCS index used for the full-duplex transmission.

13. The user equipment of claim 12, wherein the instructions further cause the processor to be configured to:

detect, in a third time resource block that is before the first time resource block, whether there is uplink scheduling information indicating to perform transmission in the second time resource block;

detect, in the first time resource block or a fourth time resource block that is before the first time resource block, whether there is downlink scheduling information indicating to perform the transmission in the second time resource block, wherein the third time resource block and the fourth time resource block are two different time resource blocks;

determine that the first time resource block comprises the scheduling grant information indicating the full-duplex transmission when the uplink scheduling information is detected in the third time resource block, wherein a quantity of time resource blocks between the first time resource block and the third time resource block meets a preconfigured difference value, and wherein the downlink scheduling information is detected in the first time resource block or the fourth time resource block; and determine that the first time resource block does not comprise the scheduling grant information indicating the full-duplex transmission when the uplink scheduling information is not detected in the third time resource block, wherein the quantity of time resource blocks between the first time resource block and the third time resource block does not meet the preconfigured difference value.

14. The user equipment of claim 13, wherein the instructions further cause the processor to be configured to:

obtain, from the uplink scheduling information in the third time resource block or from a fifth time resource block that is before the first time resource block, the first uplink transmission power used for the half-duplex transmission before correcting the first uplink transmission power used for the half-duplex transmission; and obtain the power offset in a predefined manner or from the first time resource block.

15. The user equipment of claim 13, wherein the uplink signal comprises:

uplink data information that the uplink scheduling information in the third time resource block instructs to transmit in the second time resource block; or uplink feedback information in the first time resource block corresponding to downlink data information in a fifth time resource block that is before the first time resource block.

16. The user equipment of claim 12, wherein the instructions further cause the processor to be configured to:
   detect, in the first time resource block or a fourth time resource block that is before the first time resource block, whether there is downlink scheduling information indicating to perform transmission in the second time resource block, wherein the fourth time resource block and the fifth time resource block are two different time resource blocks;
   determine that the first time resource block comprises the scheduling grant information indicating the full-duplex transmission when the uplink feedback information corresponding to the downlink data information transmission in the fifth time resource block is detected in the first time resource block, wherein a quantity of time resource blocks between the first time resource block and the fifth time resource block meets a preconfigured difference value, and wherein the downlink scheduling information is detected in the first time resource block or the fourth time resource block; and
   determine that the first time resource block does not comprise the scheduling grant information indicating the full-duplex transmission when the uplink feedback information is not detected in the first time resource block, wherein the quantity of time resource blocks between the first time resource block and the fifth time resource block does not meet the preconfigured difference value.

17. The user equipment of claim 12, wherein the instructions further cause the processor to be configured to:
   detect, in the first time resource block, whether there are uplink scheduling information and downlink scheduling information;
   determine that the first time resource block comprises the scheduling grant information indicating the full-duplex transmission when both the uplink scheduling information and the downlink scheduling information are detected in the first time resource block; and
   determine that the first time resource block does not comprise the scheduling grant information indicating the full-duplex transmission when at most one piece of scheduling information in the uplink scheduling information is detected in the first time resource block.

18. The user equipment of claim 12, wherein the instructions further cause the processor to be configured to:
   detect, in a third time resource block that is before the first time resource block, whether there is uplink scheduling information indicating to perform transmission in the second time resource block;
   detect, in the first time resource block or a fourth time resource block that is before the first time resource block, whether there is downlink scheduling information indicating to perform the transmission in the second time resource block, wherein the third time resource block and the fourth time resource block are two different time resource blocks;
   determine that the first time resource block comprises the scheduling grant information indicating the full-duplex transmission when the uplink scheduling information is detected in the third time resource block, wherein a quantity of time resource blocks between the first time resource block and the third time resource block meets a preconfigured difference value, and wherein the downlink scheduling information is detected in the first time resource block or the fourth time resource block; and
   determine that the first time resource block does not comprise the scheduling grant information indicating the full-duplex transmission when the uplink scheduling information is not detected in the third time resource block, wherein the downlink scheduling information is not detected in the first time resource block or the fourth time resource block.

19. The user equipment of claim 12, wherein the instructions further cause the processor to be configured to:
   detect, in the first time resource block or a fourth time resource block that is before the first time resource block, whether there is downlink scheduling information indicating to perform transmission in the second time resource block, wherein the fourth time resource block and the fifth time resource block are two different time resource blocks;
   determine that the first time resource block comprises the scheduling grant information indicating the full-duplex transmission when the uplink feedback information corresponding to the downlink data information transmission in the fifth time resource block is detected in the first time resource block, wherein a quantity of time resource blocks between the first time resource block and the fifth time resource block meets a preconfigured difference value, and wherein the downlink scheduling information is detected in the first time resource block or the fourth time resource block; and
   determine that the first time resource block does not comprise the scheduling grant information indicating the full-duplex transmission when the uplink feedback information is not detected in the first time resource block, wherein the downlink scheduling information is not detected in the first time resource block or the fourth time resource block.

20. The user equipment of claim 12, wherein the instructions further cause the processor to be configured to:
   detect, in the first time resource block, whether there are uplink scheduling information and downlink scheduling information;
   determine that the first time resource block comprises the scheduling grant information indicating the full-duplex transmission when both the uplink scheduling information and the downlink scheduling information are detected in the first time resource block; and
   determine that the first time resource block does not comprise the scheduling grant information indicating the full-duplex transmission when at most one piece of scheduling information in the downlink scheduling information is detected in the first time resource block.

* * * * *

UNITED STATES PATENT AND TRADEMARK OFFICE
CERTIFICATE OF CORRECTION

PATENT NO. : 10,779,241 B2
APPLICATION NO. : 15/750746
DATED : September 15, 2020
INVENTOR(S) : Lili Zhang It is certified that error appears in the above-identified patent and that said Letters Patent is hereby corrected as shown below:

In the Claims

Claim 2, Column 47, Line 11: "wherein either the" should read "wherein the"

Signed and Sealed this
Twenty-seventh Day of October, 2020

Andrei Iancu
*Director of the United States Patent and Trademark Office*